United States Patent
Robertson

(10) Patent No.: US 10,904,288 B2
(45) Date of Patent: Jan. 26, 2021

(54) IDENTIFYING AND DECEIVING ADVERSARY NODES AND MANEUVERS FOR ATTACK DECEPTION AND MITIGATION

(71) Applicant: Vencore Labs, Inc., Basking Ridge, NJ (US)

(72) Inventor: Seth Robertson, Basking Ridge, NJ (US)

(73) Assignee: Perspecta Labs Inc., Basking Ridge, NJ (US)

( * ) Notice: Subject to any disclaimer, the term of this patent is extended or adjusted under 35 U.S.C. 154(b) by 320 days.

(21) Appl. No.: 15/952,711

(22) Filed: Apr. 13, 2018

(65) Prior Publication Data
US 2018/0302438 A1 Oct. 18, 2018

Related U.S. Application Data

(60) Provisional application No. 62/486,795, filed on Apr. 18, 2017, provisional application No. 62/486,780, filed on Apr. 18, 2017.

(51) Int. Cl.
*H04L 29/06* (2006.01)
*H04L 29/12* (2006.01)
*H04L 29/08* (2006.01)

(52) U.S. Cl.
CPC ........ *H04L 63/1491* (2013.01); *H04L 63/145* (2013.01); *H04L 63/1458* (2013.01);
(Continued)

(58) Field of Classification Search
CPC ............. H04L 63/1491; H04L 63/145; H04L 63/1458; H04L 63/20; H04L 61/2007;
(Continued)

(56) References Cited

U.S. PATENT DOCUMENTS 7,971,253 B1 * 6/2011 Gupta ............... H04W 12/1202
726/23
8,327,128 B1 * 12/2012 Prince ................. H04L 63/0823
713/150
(Continued)

OTHER PUBLICATIONS

Huangxin Wang, Quan Jia, Dan Fleck, Walter Powell, Fei Li, Angelos Stavrou "A moving target DDoS defense mechanism" Computer Communications, vol. 46, pp. 10-21, Jun. 2014. (Year: 2014).*

*Primary Examiner* — Catherine Thiaw
(74) *Attorney, Agent, or Firm* — Heslin Rothenberg Farley & Mesiti P.C.

(57) ABSTRACT

A computer-implemented method, computer program product and computer system include a processor(s) receiving request from a first client for an attribute of a first service node to utilize to access the service provided. The processor(s) provides the attribute of the first service node to the first client. The processor(s) accepts an access to the service by the first client, based on the first client utilizing the attribute to connect to the first service node. The processor(s) identifies attributes of one or more clients accessing the service via the first service node, including the first client. The processor(s) experiences an event indicating a need to change security protecting access to the service. The processor(s) redistributes the one or more clients to at least two additional service nodes.

20 Claims, 7 Drawing Sheets

(52) U.S. Cl.
CPC .......... _H04L 63/20_ (2013.01); _H04L 61/2007_ (2013.01); _H04L 61/2514_ (2013.01); _H04L 67/10_ (2013.01); _H04L 2463/141_ (2013.01)

(58) Field of Classification Search
CPC ................. H04L 61/2514; H04L 67/10; H04L 2463/141
See application file for complete search history.

(56) References Cited

U.S. PATENT DOCUMENTS

| | | | |
|---|---|---|---|
| 8,613,089 B1* | 12/2013 | Holloway | H04L 63/0281 |
| | | | 726/23 |
| 9,338,184 B1* | 5/2016 | Mandapati | H04L 61/1511 |
| 2016/0028765 A1* | 1/2016 | Lingafelt | H04L 61/2015 |
| | | | 726/23 |
| 2019/0260797 A1* | 8/2019 | Yun | H04L 63/1425 |

* cited by examiner

IDENTIFYING AND DECEIVING ADVERSARY NODES AND MANEUVERS FOR ATTACK DECEPTION AND MITIGATION

CROSS-REFERENCE TO RELATED APPLICATIONS

This application claims priority to U.S. Provisional Application No. 62/486,780 filed Apr. 18, 2017, entitled, "IDENTIFYING AND DECEIVING ADVERSARY NODES" and to U.S. Provisional Application No. 62/486,795 filed Apr. 18, 2017, entitled, "MANEUVERS FOR ATTACK DECEPTION AND MITIGATION" which are both incorporated herein by reference in their entirety.

STATEMENT REGARDING FEDERALLY SPONSORED RESEARCH OR DEVELOPMENT

This invention was made with Government support under contract awarded by the Defense Advanced Research Projects Agency. The Government has certain rights in this invention.

BACKGROUND OF INVENTION

Internet-based attacks, such as Distributed Denial of Service (DDoS) attacks, typically use both observation nodes and direct attack nodes to achieve their goals. Observation nodes are used by an adversary to perform reconnaissance and gather targeting information about what nodes, names, or addresses they want to attack. This information is required for an adversary to achieve their desired effect and to discover how the attacked service is performing (i.e., so they can adjust the attack if needed). Direct attack nodes are ones that send traffic to disrupt or otherwise directly carry out the adversary mission.

SUMMARY OF INVENTION

Shortcomings of the prior art are also overcome and additional advantages are provided through the provision of a method to identify and deceive adversarial nodes. The method includes, for instance: receiving, by one or more processors, over a network connection, a request from a first client for an attribute of a first service node, wherein the attribute of the first service node is utilized to access the service provided by the one or more processors, and wherein the first service node comprises a node of one or more service nodes utilized by the one or more processors to distribute the service; providing, by the one or more processors, the attribute of the first service node to the first client; accepting, by the one or more processors, an access to the service by the first client, based on the first client utilizing the attribute to connect to the first service node; identifying, by the one or more processors, attributes of one or more clients accessing the service via the first service node, wherein the one or more clients comprise the first client; experiencing, by the one or more processors, an event indicating a need to change security protecting access to the service; and redistributing, by the one or more processors, the one or more clients to at least two additional service nodes, wherein each of the one or more clients utilizes one service node of the at least two additional service nodes to access the service, wherein the redistributing comprises: providing, by the one or more processors, the first client with a second attribute to utilize to connect to a second service node, wherein the at least two additional service nodes comprise the second service node; and accepting, by the one or more processors, an additional access to the service by the first client, based on the first client utilizing the second attribute to connect to the second service node.

Shortcomings of the prior art are overcome and additional advantages are provided through the provision of a computer program product to identify and deceive adversarial nodes. The computer program product comprises a storage medium readable by a processing circuit and storing instructions for execution by the processing circuit for performing a method. The method includes, for instance: receiving, by one or more processors, over a network connection, a request from a first client for an attribute of a first service node, wherein the attribute of the first service node is utilized to access the service provided by the one or more processors, and wherein the first service node comprises a node of one or more service nodes utilized by the one or more processors to distribute the service; providing, by the one or more processors, the attribute of the first service node to the first client; accepting, by the one or more processors, an access to the service by the first client, based on the first client utilizing the attribute to connect to the first service node; identifying, by the one or more processors, attributes of one or more clients accessing the service via the first service node, wherein the one or more clients comprise the first client; experiencing, by the one or more processors, an event indicating a need to change security protecting access to the service; and redistributing, by the one or more processors, the one or more clients to at least two additional service nodes, wherein each of the one or more clients utilizes one service node of the at least two additional service nodes to access the service, wherein the redistributing comprises: providing, by the one or more processors, the first client with a second attribute to utilize to connect to a second service node, wherein the at least two additional service nodes comprise the second service node; and accepting, by the one or more processors, an additional access to the service by the first client, based on the first client utilizing the second attribute to connect to the second service node.

Systems and methods relating to one or more aspects of the technique are also described and may be claimed herein. Further, services relating to one or more aspects of the technique are also described and may be claimed herein.

Additional features are realized through the techniques of the present invention. Other embodiments and aspects of the invention are described in detail herein and are considered a part of the claimed invention.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
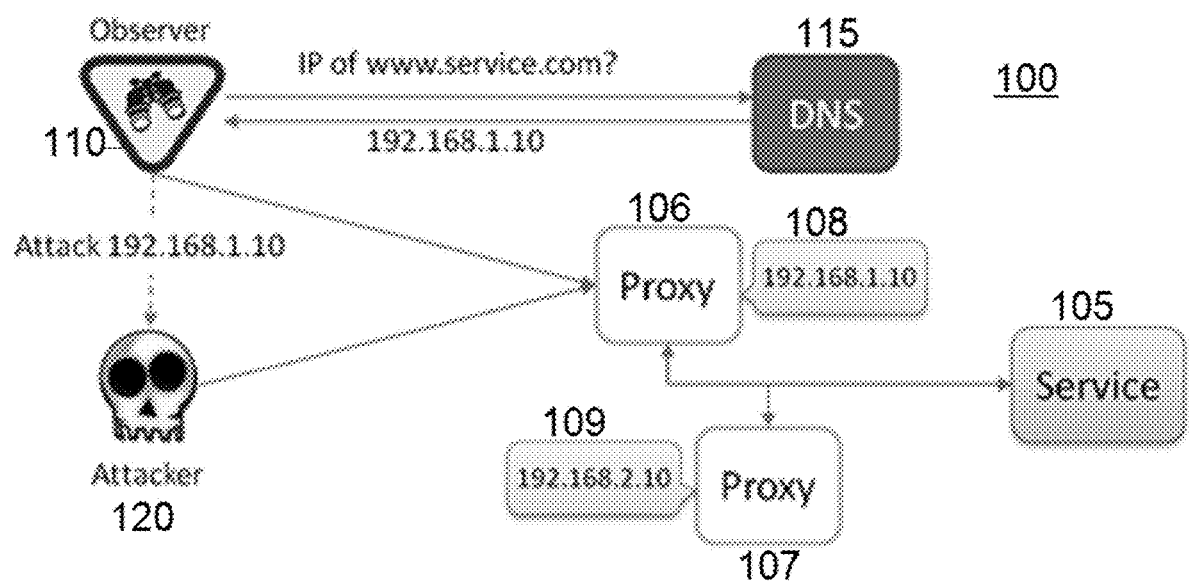
FIG. 1 is an illustration of various aspects of an environment in which aspects of embodiments of the present invention may be implemented.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 5:
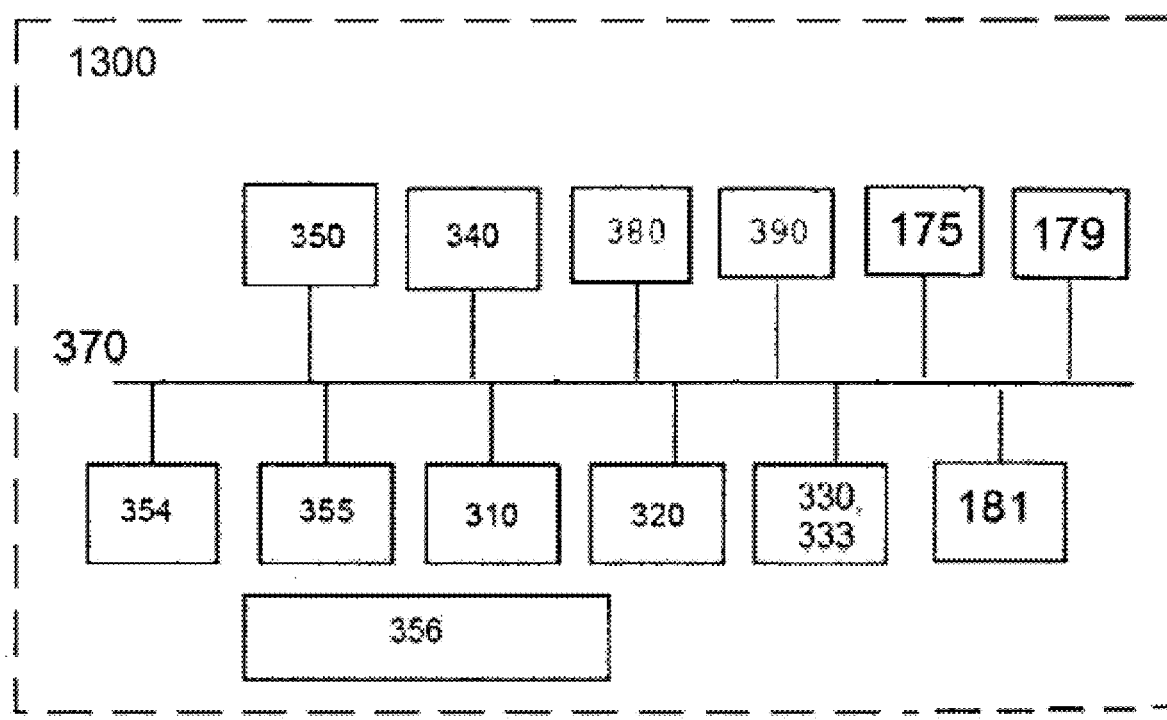
FIG. 5 depicts one embodiment of a single processor computing environment, which may comprise a node of a cloud computing environment, to incorporate and use one or more aspects of the present invention.
Figure 6:
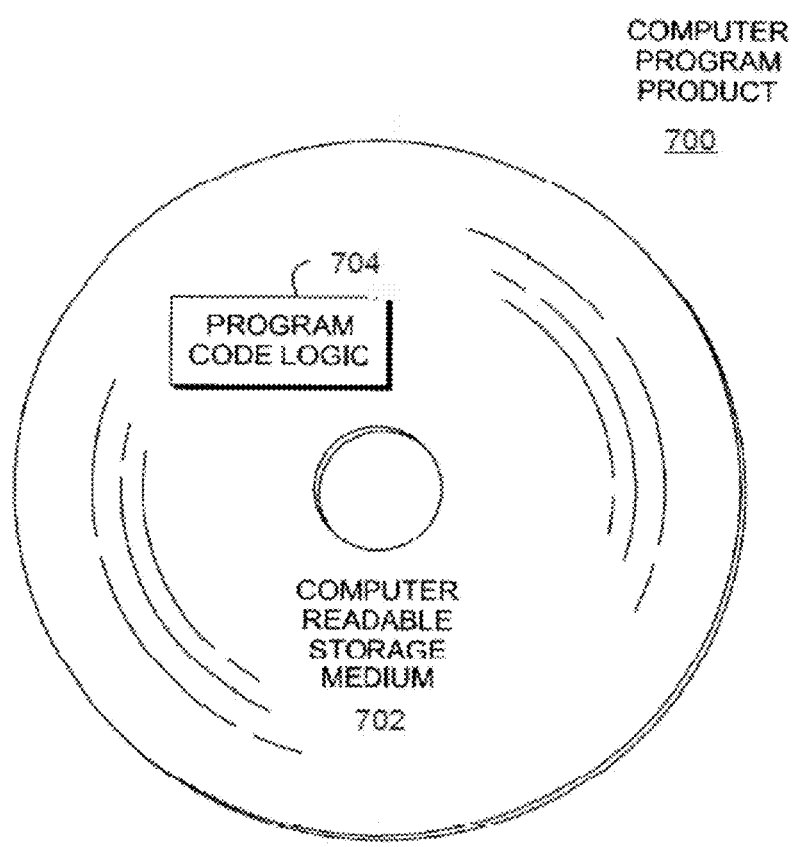
FIG. 6 depicts one embodiment of a computer program product incorporating one or more aspects of the present invention.

As understood by one of skill in the art, program code, as referred to throughout this application, includes both software and hardware. For example, program code in certain embodiments of the present invention includes fixed function hardware, while other embodiments utilized a software-based implementation of the functionality described. Certain embodiments combine both types of program code. One example of program code, also referred to as one or more programs, is depicted in FIG. 6 as program code logic 704. Another example, depicted in FIG. 5, is the program logic 330 including code 333 that may be loaded into the memory 355 and executed by the microprocessor 356 or circuitry 370.

Embodiments of the present invention include a computer-implemented method, a computer program product, and a computer system for discovering and classifying adversary observation and direct attack nodes. Specifically, certain embodiments of the present invention include a computer-implemented method, a computer program product, and a computer system for identifying observation nodes, and optionally deceiving the identified observations nodes. An observation node is a legitimate user whose system has been compromised or an adversary node acting like a legitimate user, either for the purpose of relaying targeting information. In embodiments of the present invention, one or more programs executed by at least one processing resource: 1) receive, over a network connection, a request from a first client for an attribute of a first replicated service node, where the attribute of the first replicated service node is utilized to access the service provided by the one or more processors (executing the one or more programs), and where the first replicated service node includes a node of one or more replicated service nodes utilized by the one or more processors to distribute the service; 2) provide the attribute of the first replicated service node to the first client; 3) accept an access to the service by the first client, based on the first client utilizing the attribute to connect to the first replicated service node; 4) identify attributes of one or more clients accessing the service via the first replicated service node, where the one or more clients include the first client; 5) experience an event indicating a need to change security protecting access to the service; and 6) redistribute the one or more clients to at least two additional replicated service nodes, where each of the one or more clients utilizes one replicated service node of the at least two additional replicated service nodes to access the service. In some embodiments of the present invention, the one or more programs redistribute the clients by providing the first client with a second attribute to utilize to connect to a second replicated service node, where the at least two additional replicated service nodes comprise the second replicated service node and accepting an additional access to the service by the first client, based on the first client utilizing the second attribute to connect to the second replicated service node.

Observation nodes are adversarial nodes (as opposed to nodes being utilized by legitimate users), but identifying observational nodes can be problematic because observation nodes do not attack (themselves). As aforementioned, observation nodes may have formerly been legitimate users, but they have been compromised and are utilized to relay targeting information to direct attack nodes (e.g., adversarial nodes who attack network resources). Alternatively, observation nodes may be adversarial nodes that were never legitimate, but acted like legitimate users, to mislead defensive systems. A common network challenge is identifying and disconnecting access to services for observation nodes without adversely affecting the services provided to legitimate users. Thus, in embodiments of the present invention, program code executing on at least one processor identifies observation nodes based on their direct behavior.

Aspects of embodiments of the present invention provide advantages over known methods of mitigating attacks by adversarial nodes based on being able to identify illegitimate nodes that cannot be identified by current methods. For example, some embodiments of the present invention include aspects that identify bad actors in a network, including observation nodes and direct attack nodes, that cannot be identified by known adverse behaviors, such as sending a large number of packets, including incorrectly addressed packets, and/or corrupted/incorrectly formatted packets, and do not have IP addresses belonging to known compromised nodes (e.g., black lists). Embodiments of the present invention include one or more programs that identify observation nodes and direct attack node which have not connected to the target service recently, so no profile of their historic behavior is available. Existing DDoS approaches (cloud- or appliance-based) focus only on protecting services from attack nodes by mitigating such attacks via various means (e.g., source rate limiting, connection aging, dynamic filtering). These existing approaches, unlike aspects of embodiments of the present invention, do not identify and track observation nodes responsible for orchestrating DDoS attacks. Thus, unlike existing approaches, embodiments of the present invention are applicable to services that may not have a closed user group (i.e., the set of clients that may connect to the service via the Internet or other network is not completely known a priori or when the originating addresses of those clients may change or be impersonated, or when the set of clients is large, or when some of the clients may be compromised by an adversary). Embodiments of the present invention may include aspects that address adversarial nodes even when these nodes change tactics during an attack to ensure that the attack succeeds.

Figure 2:
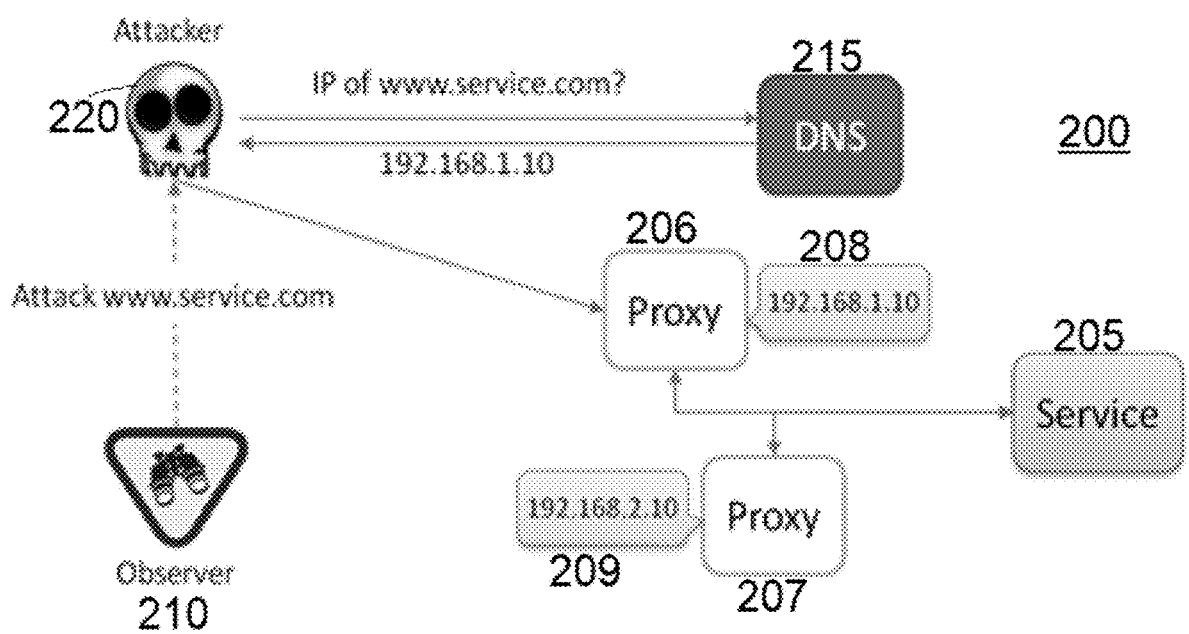
FIG. 2 is an illustration of various aspects of an environment in which aspects of embodiments of the present invention may be implemented.

FIGS. 1-2 illustrate aspects of attacks on services (i.e., scenarios) in a technical environment 100 200 that can be mitigated by aspects of embodiments of the present invention. FIG. 1 illustrates a DDoS scenario in a technical environment 100 where an observation node 110 is responsible for discovering an (IP) address 108 of a proxy 106, used to provide access to a service 105. FIG. 2 illustrates a DDoS scenario in a technical environment 200 where an attacker node 220 is responsible for discovering an (IP) address 208 of a proxy 206, used to provide access to a service 205. As understood by one of skill in the art, an adversarial node discovering and attacking a service IP address would compromise the access/availability/performance of the service for legitimate users. The nodes, including the services 105 205, the proxies 106 107 206 207, the observer nodes 110 210, and the attacker nodes 120 220 in these technical environments 100 200 each represent one or more computing resources, including but not limited to servers, personal computing devices, mobile computing devices, etc. These various nodes of the technical environment 100 200 communicate over various network protocols and may communicate over an Internet connection. The various nodes may comprise resources in a distributed computing system, including but not limited to, a cloud computing system.

FIG. 1 illustrates technical environment 100 where a service 105 is provided through two proxies 106 107 (the number of proxies utilized is for illustrative purposes, only and does not suggest any limitations to the utilization of aspects of the present invention across various environments). The proxies 106 107, which are each associated with an IP address 108 109, each relay traffic between nodes and the service 105. Thus, nodes that request the service 105, including legitimate nodes (not pictured) and adversarial nodes, including observation nodes 110 and attacker nodes 120, interact with a proxy 106 107 instead of the service 105 itself. Each proxy, a first proxy 106 and a second proxy 107 have IP addresses, respectively, a first IP address 108, and a second IP address 109. An observation node 110 interacts with a domain name system (DNS) service instance 115 in order to retrieve an IP address associated with a service (e.g., www.service.com), so that an attack can be made on the node with the IP address discovered, in this example, the first IP address 108, associated with the first proxy 106. After the observation node 110 learns an IP address, in this case, the first IP address 108, the observation node 110 directs at least one attacker node 130 to the discovered IP address, the first IP address 108. The observation node 110 interacts with the node 106 with the targeted IP address 108, in order to monitor the impact of the attack.

FIG. 2 illustrates a scenario in a technical environment 200 where an observation node 210 tasks one or more attacker nodes 220 to attack a service 205 using the domain name of the service (e.g., www.service.com). Thus, the at least one attacker node 220 interact with a DNS service 115 to discovering an IP address 208 associated with the service 205. In this example, the IP address discovered by the at least one attacker node 205 is an IP address 208 associated with a first proxy 206 of the service 205.

In some embodiments of the present invention, program code identified observation nodes (e.g., 110, FIG. 1, 210, FIG. 2) by: 1) adjusting and replicating the address the service (e.g., an Internet service; e.g., 105, FIG. 1, 205, FIG. 2) is being provided from (i.e., the service address) and 2) correlating the adjusting and replicating with subsequent malicious activity involving that service address.

Various embodiments of the present invention may utilize differing approaches to adjust and replicate the service address. For example, the program code (executed by at least one processor) may create multiple proxy systems, where each proxy relays traffic between a client and a real service, using DNS servers to select the appropriate proxy system on behalf of client systems. The program code may generate the proxy systems are created on virtual machine hosts that are multiply and reliably connected via fast network links to networks that clients and servers can be accessed from (e.g., Amazon's Elastic Compute Cloud or Google's Compute Engine). An advantage of this virtual machine-based approach is that the program code generates proxies that can be created, moved, and destroyed at will and can be created at multiple geographically dispersed regions (e.g., Seattle, Ireland, Seoul) to achieve sufficient separation from the target of the attack to a new proxy that will start providing the service. Other approaches to replicate the service address utilized in embodiments of the present invention include the program code using network address translation, creating additional servers that respond to a request for a service, and utilizing anycasting. Anycasting is a network addressing and routing method in which datagrams from a single sender are routed to any one of several destination nodes, selected on a defined basis, including but not limited to which is the nearest, lowest cost, healthiest, with the least congested route, etc.

In embodiments of the present invention, one or more programs identify observation nodes by correlating observer behavior to subsequent changes in an attack. This approach may be utilized to mitigate attacks that target a specific IP address of one proxy (or other replicated service address), as illustrated in FIGS. 1-2. Although FIGS. 1-2 illustrated a single observer node 110 210, embodiments of the present invention are also effective in mitigating attacks in the presence of multiple observers. For example, with multiple observers, there may be multiple semi or completely independent attacks targeting different proxy IP addresses (or other addresses) at the same time. As illustrated in FIG. 1, an observer 110 obtains legitimate service by masquerading as a non-malicious client, using legitimate-looking direct or indirect client requests. As part of this process, the observer 110 discovers the address of the service targeted (e.g., via a DNS request to resolve the domain name of the service, as shown in FIG. 1). The observer 110 can then provide that address to the attack nodes 120 which will attempt to bring down that service.

Figure 3:
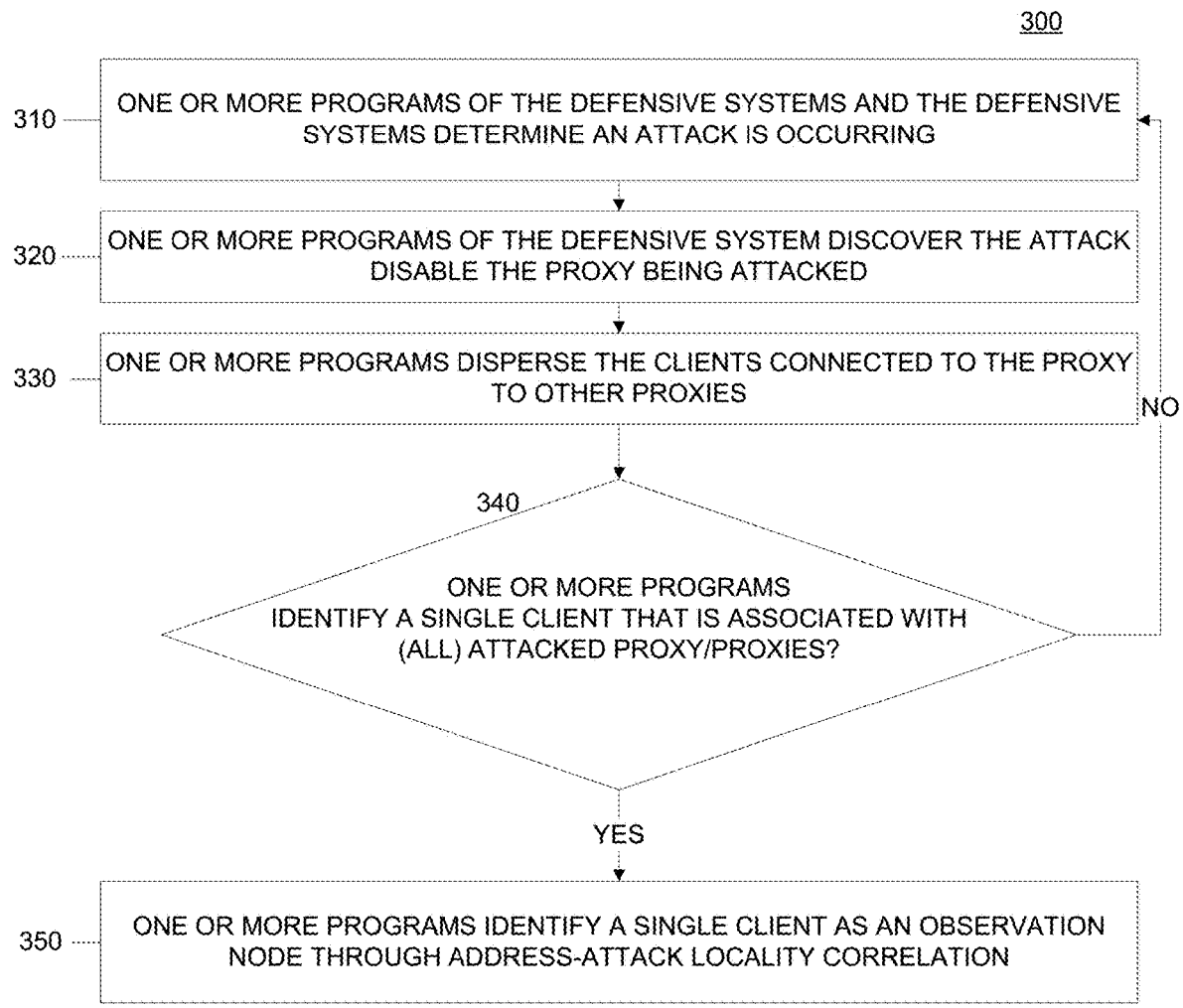
FIG. 3 is a workflow illustrating certain aspects of some embodiments of the present invention.

FIG. 3 illustrates a workflow 300 of aspects of some embodiments of the present invention that are responsive to the attack of the service 105 illustrated in FIG. 1. In embodiments of the present invention, one or more programs of the defensive systems and the defensive systems determine an attack is occurring (310) and disable the proxy 106 being attacked (320) and disperse the clients connected to the proxy 106 to other proxies, potentially including new proxies created on the fly (330). Not all clients on the attacked system will be dispersed to the same proxy server, instead they will be distributed among some set of proxies.

The observation node will eventually request information about or interact with the service 105 again and as a result of that interaction, will obtain the IP address of a new proxy, which was created by the one or more programs on the fly. The observation node will then pass the IP address of this new proxy to the attackers 120, who will then start attacking that new proxy. In some situations, the observation node 110 will task attacker node(s) 120 soon (less than hours later) after obtaining an IP address for a service 105 to target. The observation node will be one of the nodes that was associated with the original attacked proxy 106 and is now associated with the newly attacked proxy (not pictured). The one or more programs of the defensive system will discover the attack (310) disable the new proxy being attacked (320) and disperse the clients that are on the new proxy to multiple proxies (330). Thus, the as yet unidentified observation node, along with a small number of other legitimate clients, will be migrated to a newer proxy (which will eventually be attacked); other legitimate clients will be migrated to another proxy (which would not be immediately attacked since the observation node is of yet unaware of it). This one or more programs continue to detect (310), disable (320), and disperse (330) until the one or more programs can identify a single client that is associated with all the attacked proxies (340). Thus, the one or more programs identify the single client as the observation node 110 through address-attack locality correlation (350). In some embodiments of the present invention, where no single node is associated with all attack proxies, the one or more programs identify a set of colluding observation nodes.

In some embodiments of the present invention, the IP addresses of legitimate clients are learned during client interactions with the service. The one or more programs may assign each of these clients to a random proxy when the client requests the IP address of the service from a DNS service. Strangers (i.e., clients for which no prior service interaction information is available) may be assigned to specific proxies.

In some embodiments of the proposed method, the one or more programs of the defensive system maintains a set of IP addresses assigned to a specific proxy during a configurable time window. Thus, as the attack progresses and different proxies are allocated and attacked, as described above, the one or more programs determine an intersection of these IP address sets across all attacked proxies. Common IP addresses in the intersection correspond to potential observation nodes (e.g., 110, FIG. 1). As time goes by and the attack (e.g., DDoS attack) continues, IP addresses that appear in several computed intersections belong to actual observation nodes (e.g., 110, FIG. 1).

In the method illustrated in FIG. 3, the time the one or more programs take to identify observation nodes depends on three main factors: the number of proxies that can be created, the time it takes to detect when a proxy is under an attack, and the time it takes the attacker to change tactics. When a large number of proxies are available, one or more programs in embodiments of the present invention identify observer nodes as soon as the one or more programs detect that a proxy is under DDoS attack because the one or more programs can assign each service DNS request to its own proxy. Thus, the one or more programs can rapidly isolate an observer node (e.g., 110, FIG. 1). When a limited number of proxies are available, identifying observation nodes may require the DDoS detection illustrated in FIG. 3 to be repeated at multiple proxies, over time. Coupling various deception techniques described herein with the aspects of FIG. 3 may accelerate detections of observation nodes.

Figure 4:
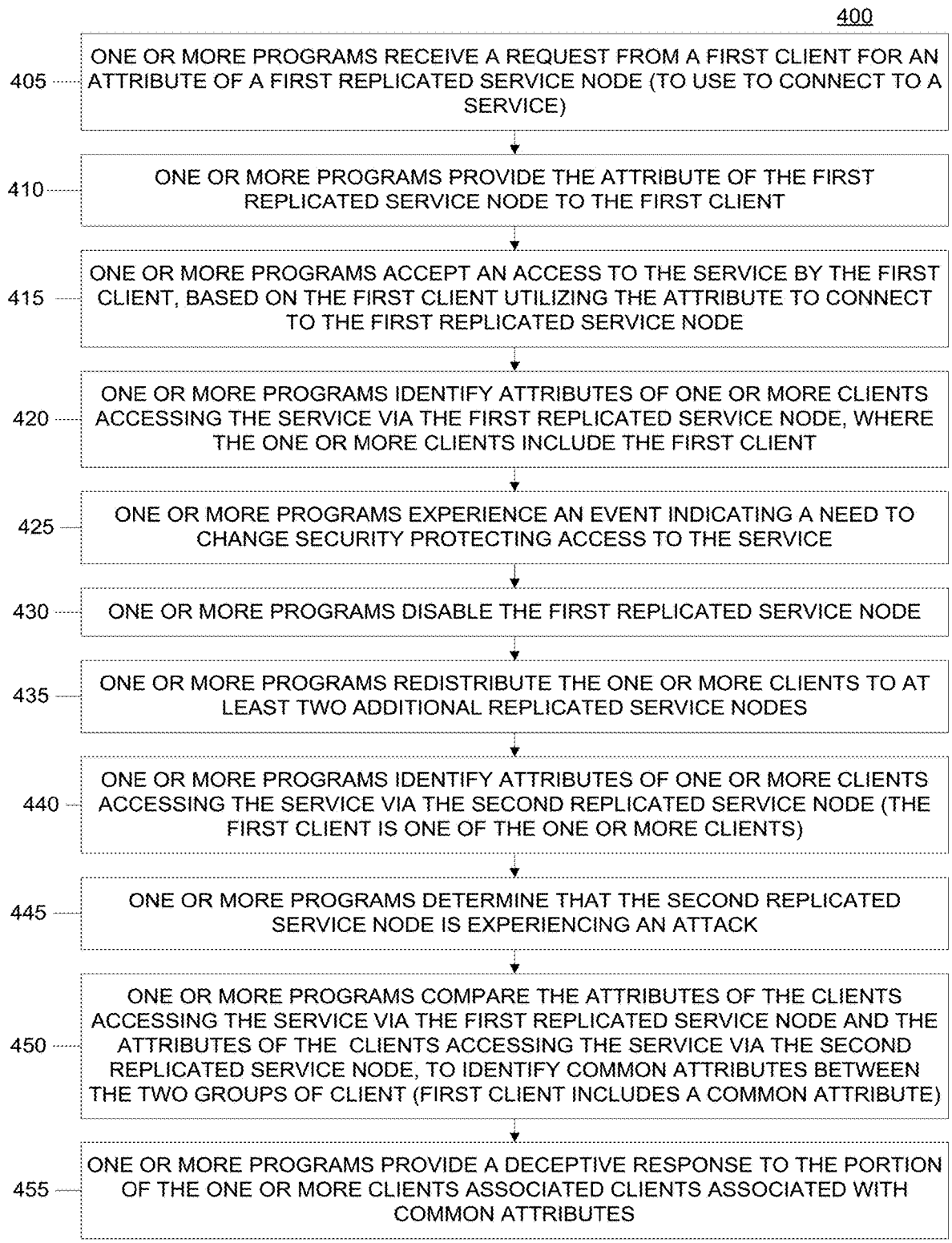
FIG. 4 is a workflow illustrating certain aspects of some embodiments of the present invention.

FIG. 4 depicts a workflow 400 that illustrates certain aspects of embodiments of the present invention. Embodiments of the present invention include a computer-implemented method, a computer system, and a computer program product that include one or more programs executed by one or more processors that receive, over a network connection (e.g., the Internet), a request from a first client for an attribute (e.g., address, IP address) of a first replicated service node, where the attribute of the first replicated service node (e.g., a proxy) is utilized to access the service provided by the one or more processors executing the one or more programs, and where the first replicated service node includes a node of one or more replicated service nodes (e.g., proxies) utilized by the one or more processors to distribute the service (405). The one or more programs provide the attribute of the first replicated service node to the first client (410). The one or more programs accept an access to the service by the first client, based on the first client utilizing the attribute to connect to the first replicated service node (415). The one or more programs identify attributes (e.g., addresses, IP addresses) of one or more clients accessing the service via the first replicated service node, where the one or more clients include the first client (420). The one or more programs experience an event indicating a need to change security protecting access to the service (425). In experiencing the event, the one or more programs may determine that the first replicated service node is experiencing an attack. The one or more programs may also experience an event by determining that one or more adversarial client is present on the network. As understood by one of skill in the art, to determine that a node is experiencing an attack, embodiments of the present invention may utilize various means of monitoring various nodes to determine that activity comprises an attack. For example, a DDoS attack comprises certain types of activities.

Returning to FIG. 4, the one or more programs disable the first replicated service node (430). The one or more programs redistribute the one or more clients to at least two additional replicated service nodes (e.g., proxies), where each of the one or more clients utilizes one replicated service node of the at least two additional replicated service nodes to access the service (435). In some embodiments of the present invention, the one or more programs may disable the node (430) and redistributed the clients (435) consecutively, with either action preceding the other, or in parallel. In some embodiments of the present invention, the one or more programs may not disable the attacked service node, but may redistribute the clients connected to the service utilizing this node.

In some embodiments of the present invention, the one or more programs redistribute the clients by providing the first client with a second attribute (e.g., address, IP address) to utilize to connect to a second replicated service node, where the at least two additional replicated service nodes comprise the second replicated service node. The one or more programs accept an additional access to the service by the first client, based on the first client utilizing the second attribute to connect to the second replicated service node.

Returning to FIG. 4, in some embodiments of the present invention, the one or more programs identify attributes (e.g., addresses, IP addresses) of one or more clients accessing the service via the second replicated service node (e.g., proxy); the first client is one of the one or more clients (440). The one or more programs determine that the second replicated service node is experiencing an attack (445). The one or more programs compare the attributes of the one or more clients accessing the service via the first replicated service node and the attributes of the one or more clients accessing the service via the second replicated service node, to identify a portion of the one or more clients associated with at least one common attributes between the one or more clients accessing the service via the first replicated, where the first client includes a common attribute of the at least one common attributes (450).

In some embodiments of the present invention, after the one or more programs compare the attributes of the one or more clients accessing the service via the first and second replicated service node, the one or more programs redistribute the one or more clients accessing the service via the second replicated service node to at least two new replicated service nodes, where the at least two new replicated service nodes include a third replicated service node and a fourth replicated service node. To redistribute the client(s), the one or more programs provide the portion of one or more clients represented by the common attributes with a third attribute (e.g., address, IP address) to utilize to connect to the third replicated service node. Meanwhile, the one or more programs provide the clients accessing the service via the second replicated service node which are not represented by the common attributes (i.e., not in the portion), with a fourth attribute (e.g., address, IP address) to utilize to connect to the third replicated service node.

Returning to FIG. 4, in some embodiments of the present invention, after identifying the portion (450), the one or more programs provide a deceptive response to the portion of the one or more clients associated clients associated with common attributes (455). The term "deceptive response" is used broadly to characterize a response of the one or more programs subsequent to determining that a node is being experiencing an attack (e.g., 425, 445). As will be discussed herein, the deceptive response may include delaying responses from the second replicated service node to the portion of the one or more clients, replicating network congestion by dropping one or more messages at one or more frequencies, and/or synthesizing one or more artificial responses to the portion of the one or more clients to indicate that the service is unavailable. However, the deceptive response may also be redistributing clients connected to an attacked service node to different service nodes.

Returning to FIG. 4, the deceptive response provided by the one or more programs may vary depending upon the results of the comparison (450). Returning to the discussed embodiments where the one or more programs redistribute clients to a third replicated service node, the one or more programs may also provide a deceptive response in this situation, to the service node where the portion of the client with the common attributes were redistributed to. Specifically, the one or more programs provide a deceptive response, via the third replicated service node, to the portion of the one or more clients while providing, via the fourth replicated service node, access to the service. The type of deceptive response can vary in this example as well.

In some embodiments of the present invention, the deceptive response includes the one or more programs performing another redistribution of the clients. As discussed above, this type of deception action may be used in embodiments of the present invention when the one or more programs cannot yet identify the observation node among the nodes connected to a given service node (e.g., proxy), after determining that this service node is being attacked. In some embodiments of the present invention, the deceptive act is the one or more programs simulating activities indicating that the attack was successful. This way, the (now identified and isolated) observation node will communicate the successful attack to the attacker node. In this case, the observation node may stop mutating the attack and continue to attack the same service node. The program code sacrifices this node to the attacker so that the legitimate users can continue to use other nodes. To simulate a successful attack on a service node, the one or more programs may analyze the attack on the service node and based on this analysis, construct the deceptive response of simulating activities indicating that the attack was successful.

As discussed above, one response to an attack on a given node, referred to as a deceptive response, is for the program code to redistribute the clients connected to that node to different nodes. This program code is then able, after an attack on a subsequent node, to determine which clients were connected to both of the nodes that suffered attacks; the program code determines which of the clients were connected to, or provided the address of, both the first attacked node and the second attacked node. If observation node 110 obtains an address 108 from a DNS server 115, the observation node 110 may not interact with proxy 106 before providing the address 108 to the attack node 120, although in many scenarios, the observation node 110 will interact with proxy 106, in order to monitor the attack. This identification narrows the pool of clients that could be observation nodes. The program code can continue to redistribute the clients connected to attacked nodes until a node connected in each instance is revealed to be an observation node.

Thus, when the program code redistributes the clients as a deceptive response/maneuver in response to the attack on the second replicated service node, the one or more programs redistribute the clients accessing the service via the second replicated service node. Thus, as noted in FIG. 4, the one or more programs redistribute the clients accessing the service via the second replicated service node to at least two new replicated service nodes (e.g., proxies). Continuing the example of the first client, to redistribute the clients accessing the service via the second replicated service node, the one or more programs provide the aforementioned first client with a third attribute (e.g., address, IP address) to utilize to connect to a third replicated service node. This third replicated service node is one of the at least two new replicated service nodes. The one or more programs then accept an additional access to the service by the first client, based on the first client utilizing the third attribute to connect to the third replicated service node.

In addition to the deceptive responses discussed above, the one or more programs may take one or more of the following actions as a deceptive response (to identifying one or more observation nodes): delay responses from the second replicated service node to the portion of the one or more clients, replicate network congestion by dropping one or more messages at one or more frequencies, and/or synthesize one or more artificial responses to the portion of the one or more clients to indicate that the service is unavailable.

Once the first client has utilized the third attribute to connect to the third replicated service node, the one or more programs can monitor this service node. In some embodiments of the present invention, the one or more programs identify attributes of one or more clients accessing the service via the third replicated service node, where one of the one or more clients is the first client. The one or more programs determine that the third replicated service node is experiencing an attack. The one or more programs compare the attributes of the one or more clients accessing the service via the first replicated service node, the attributes of the one or more clients accessing the service via the second replicated service node, and the attributes of the one or more clients accessing the service via the second replicated service node to identify a particular portion of the one or more clients associated with one or more common attributes between the one or more clients accessing the service via the first replicated service, the one or more clients accessing the service via the second replicated service node, and the one or more clients accessing the service via the third replicated service node, where the attribute of the first client includes a common attribute of the one or more attributes. The one or more programs can then provide this particular portion, which includes the first client, with an additional deceptive response.

FIG. 5 illustrates a block diagram of a resource 1300 in computer system, such as observer 110 210, attacker 120 220, DNS server 115 215, service node 105 205, proxies 106 107 206 207, which are part of the technical architecture of certain embodiments of the technique. The resource 1300 may include a circuitry 370 that may in certain embodiments include a microprocessor 354. The computer system 1300 may also include a memory 355 (e.g., a volatile memory device), and storage 181. The storage 181 may include a non-volatile memory device (e.g., EPROM, ROM, PROM, RAM, DRAM, SRAM, flash, firmware, programmable logic, etc.), magnetic disk drive, optical disk drive, tape drive, etc. The storage 355 may comprise an internal storage device, an attached storage device and/or a network accessible storage device. The system 1300 may include a program logic 330 including code 333 that may be loaded into the memory 355 and executed by the microprocessor 356 or circuitry 370.

In certain embodiments, the program logic 330 including code 333 may be stored in the storage 181, or memory 355. In certain other embodiments, the program logic 333 may be implemented in the circuitry 370. Therefore, while FIG. 2 shows the program logic 333 separately from the other elements, the program logic 333 may be implemented in the memory 355 and/or the circuitry 370.

Using the processing resources of a resource 1300 to execute software, computer-readable code or instructions, does not limit where this code can be stored.

Referring to FIG. 6, in one example, a computer program product 700 includes, for instance, one or more non-transitory computer readable storage media 702 to store computer readable program code means or logic 704 thereon to provide and facilitate one or more aspects of the technique.

As will be appreciated by one skilled in the art, aspects of the technique may be embodied as a system, method or computer program product. Accordingly, aspects of the technique may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the technique may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable signal medium may include a propagated data signal with computer readable program code embodied therein, for example, in baseband or as part of a carrier wave. Such a propagated signal may take any of a variety of forms, including, but not limited to, electro-magnetic, optical or any suitable combination thereof. A computer readable signal medium may be any computer readable medium that is not a computer readable storage medium and that can communicate, propagate, or transport a program for use by or in connection with an instruction execution system, apparatus or device.

A computer readable storage medium may be, for example, but not limited to, an electronic, magnetic, optical, electromagnetic, infrared or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the technique may be written in any combination of one or more programming languages, including an object oriented programming language, such as Java, Smalltalk, Java, Python, R-Language, C++ or the like, and conventional procedural programming languages, such as the "C" programming language, assembler or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the technique are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions, also referred to as computer program code, may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In addition to the above, one or more aspects of the technique may be provided, offered, deployed, managed, serviced, etc. by a service provider who offers management of customer environments. For instance, the service provider can create, maintain, support, etc. computer code and/or a computer infrastructure that performs one or more aspects of the technique for one or more customers. In return, the service provider may receive payment from the customer under a subscription and/or fee agreement, as examples. Additionally or alternatively, the service provider may receive payment from the sale of advertising content to one or more third parties.

In one aspect of the technique, an application may be deployed for performing one or more aspects of the technique. As one example, the deploying of an application comprises providing computer infrastructure operable to perform one or more aspects of the technique.

As a further aspect of the technique, a computing infrastructure may be deployed comprising integrating computer readable code into a computing system, in which the code in combination with the computing system is capable of performing one or more aspects of the technique. As a further aspect of the technique, the system can operate in a peer to peer mode where certain system resources, including but not limited to, one or more databases, is/are shared, but the program code executable by one or more processors is loaded locally on each computer (workstation).

As yet a further aspect of the technique, a process for integrating computing infrastructure comprising integrating computer readable code into a computer system may be provided. The computer system comprises a computer readable medium, in which the computer medium comprises one or more aspects of the technique. The code in combination with the computer system is capable of performing one or more aspects of the technique.

Further, other types of computing environments can benefit from one or more aspects of the technique. As an example, an environment may include an emulator (e.g., software or other emulation mechanisms), in which a particular architecture (including, for instance, instruction execution, architected functions, such as address translation, and architected registers) or a subset thereof is emulated (e.g., on a native computer system having a processor and memory). In such an environment, one or more emulation functions of the emulator can implement one or more aspects of the technique, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the fetched instructions and to determine the type of instructions that have been fetched; and an instruction execution unit to execute the instructions. Execution may include loading data into a register from memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

Embodiments of the present invention may be implemented in cloud computing systems.

In addition to the functionality of the one or more programs in the method, computer program product, and system illustrated in FIGS. 3-4 to identify and deceive adversarial nodes, some embodiments of the present invention may utilize a different approach to correlating approach to handle the case where the adversary does not perform IP address-based targeting, but rather asks each direct attack node to obtain a target IP address based on the service name (e.g., attack nodes interact with a DNS service for the purpose of obtaining an IP address associated with the service).

In embodiments of the present invention utilizing this approach, this method uses temporal correlation of service access to changes in attack behavior, and is useful for services where clients may obtain service at random intervals. In this case, the observation node is not attempting to find a target address to attack, but rather is attempting to discover whether the service is still alive. This can be achieved by attempting to access the service in the same way legitimate nodes access the service. For example, for a Web-based service, the adversary can just try to load the landing page of the service in a Web browser.

Assuming defensive systems are sufficiently capable, the service will remain alive while the attack is going on. The adversary, using the observation node or nodes, will see that the service is still alive and after an interval, will change what type of attack they are performing to try and find an attack type that the defensive system cannot handle. For example, the attacker may increase the number of attack nodes or select a different type of attack (e.g., switch to fragmented packets instead of SYN floods).

The method marks the clients that obtain access to the service just prior to the time the attack changed in character. As the attack progresses, fewer and fewer clients will have interacted with the service every time just before the attack changed, subject to some time window T. Once a small number of potential observation nodes have been identified, the defensive system can attempt to deceive the potential observation nodes one by one into believing that the service is not available. The method identifies the observation node as the one where its deception results in the attack stopping mutating in character.

In one embodiment of the proposed method, the DNS service is under the control of the defensive system. The DNS service maintains a list of node IP addresses that request service name resolution during a configurable time interval (note that this list could be managed by a cloud-based service or some other service/process other than the DNS service itself). In addition, the DNS service remembers a configurable number of such lists for different time intervals. The intersection of such lists for the time intervals prior to DDoS attack behavior changes identifies potential attack and observation nodes.

In a second embodiment of the proposed method, the proxies that relay traffic between nodes and the service itself may maintain the list of IP addresses that are interacting with the service during a configurable time interval. In a third embodiment, the multiple set of dynamically instantiated services may maintain that list or lists of interactive IP addresses. Similar to the above case, the interaction of these lists for specific time intervals across the proxies yields potential attack and observation nodes.

Once the defensive service identifies potential attack and observation nodes, it then filters out attack nodes based on their service interactions patterns. For example, a clustering approach can identify outliers as observation nodes.

Multiple observation nodes may be used by the adversary to attempt to subvert this type of analysis. The method maintains information about the number of instances a proxy that each client has used/discovered has been attacked (or the attack characteristics have changed) for each node attempting to gain service until sufficient time has passed without those proxy nodes being attacked to make the chances of that node being an observation node be small. The method may tentatively identify multiple nodes as being potential candidate for observation nodes and try deceiving different combinations of these nodes to see how the adversary/attack reacts. In this way, the full set of observation nodes are identified.

Once one or more observation nodes have been identified by the method illustrated in FIGS. 3-4 of the deviation from this method described above, or by other methods, the defender may either deny the observation nodes service or attempt to deceive the observation node into thinking that their attack is being partially or completely successful. Denying service to the observation nodes may perform the intended service of deceiving the adversary, but other more subtle options are available. For instance, the defensive system could delay responses, to make it appear that the attack is slowing the system down. It could drop messages or packets at various frequencies to replicate the effect of network congestion. It could synthesize artificial responses indicating error messages saying that the service is unavailable (e.g., HTTP 503 service unavailable).

Ideally, the defensive system will analyze the attack and attempt to construct deceptive responses that would simulate the effects of a successful attack and follow the attack flow so that if the attack were to decrease in intensity, the simulated attack effects would decrease in intensity. Alternately, the defensive system could create an artificial deceptive simulation of the actual service and direct all attacker and observer traffic to that simulation so that the observers see the real effects of their attack while legitimate users going to the real servers obtain normal service. Such an artificial deceptive simulation can be realized using existing honeypot technologies, or by setting up sacrificial copies of the service.

Embodiments of the present invention include a computer-implemented method, a computer program product, and a computer system, where one or more programs, executed by one or more processors receive, over a network connection, interactions from a plurality of clients with a service, wherein the one or more processors provide the service via one or more replicated service nodes. The one or more programs associates, a timestamp with each of the interactions. The one or more programs determine, during one or more time intervals, that at least one replicated service node of the one or more replicated service nodes is affected by an attack. The one or more programs identify, based on the timestamps, one or more clients of the plurality of clients that interacted with the service during the one or more time intervals. The one or more programs determine that certain of the one or more clients comprise observation nodes, based on the certain of the one or more clients having interacted with the service during a threshold numbers of the one or more intervals.

In some embodiments of the present invention, the one or more programs determine that at least one replicated service node of the one or more replicated service nodes is affected by an attack by one or more of: determining that the at least one replicated service node is subject to a new attack or determining that an in-process attack on of the at least one replicated service node has changed in nature. In some embodiments of the present invention, the attack comprises a Distributed Denial of Service (DDoS) attack.

In some embodiments of the present invention, the one or more programs associate the timestamp with each of the interactions by executing a service or a process, to maintain a list of addresses of the plurality of clients and associating the timestamp with a time interval of the one or more time intervals. The service or process may include a Domain Name System (DNS) service. The one or more programs may identify further based on the addresses. The address may include Internet Protocol (IP) addresses.

In some embodiments of the present invention, the one or more programs determine that certain of the one or more clients comprise attack nodes, based on the certain of the one or more clients having interacted with the service during a threshold numbers of the one or more intervals. The service or process may be executed by the one or more replicated service nodes. The one or more replicated service nodes may comprise proxies.

In some embodiments of the present invention, the one or more programs determine that the certain of the one or more clients comprise observation nodes by utilizing a clustering approach to identify outliers as the observation nodes.

In some embodiments of the present invention, the one or more programs filter out the attack nodes, based on service interactions patterns of the attack nodes.

In some embodiments of the present invention, the one or more programs direct the attack nodes to a designated replicated service node of the one or more replicated service nodes.

In some embodiments of the present invention, one or more program identify direct attack nodes (e.g., 120, FIG. 1, 220, FIG. 2). Existing methods distinguish direct attack nodes from legitimate users by using historical behavior of the client. Unfortunately, not all clients have historical behavior. Some may attach to the service for the first time during an attack. If they are legitimate clients, the one or more programs should provide a decent level of service, within a short amount of time. If they are attackers or observers, the one or more programs should provide no service or a deceptive level of service, within a short amount of time.

Embodiments of the present invention can stall the new clients (strangers) for a short amount of time and use the time to probe the client or gather more information that will be sufficient for the defensive system to distinguish between legitimate and illegitimate clients.

This method uses different types of actions to obtain information to identify attack nodes:

System optionally performs action and observes resulting client behavior to determine if observed behavior follows expected behavior based on standards of the protocols used. System clusters observed behavior and compares it to known behaviors of good and bad clients.

System Action: Drop packets. Observations: Packet/request retry frequency and timing; change in packets/bytes transmitted per second System Action: Drop multiple packets in sequence/burst. Observation: Retransmission strategy (e.g., are retransmitted packets aggregated?)

System Action: Delay packets. Observation: Change in packet/bytes transmitted per second, window size (for TCP), and calculated Round-Trip Time (RTT).

System Action: Corrupt (change with incorrect checksum), manipulate (change with correct checksum), or duplicate response packets, Observation: Network and protocol error messages and subsequent client behavior (e.g., retransmission, changes in transmitted packets/bytes per second).

System Action: Adjust apparent network characteristics (e.g. adjust maximum transmission unit (MTU or maximum packet size), window size (for TCP), available bandwidth, spurious source quench), Observation: changes in transmitted packet size, changes in packets/bytes transmitted per second.

System Action: Adjust protocol options in response (e.g., TCP options, SSL negotiation options, SSL server certificate). Observation: Subsequent client behavior (e.g., error for illegal option, following different behavior for other options)

Passive—No System Action. Observation: Sequence number selection and sequence, packet id selection and sequence, TCP options selected, Time To Live (TTL), and other choices that are Operating System (OS) dependent and therefore reveal the client's probable host and application OS name and version.

System responds with actions for client application or client user, and observes if specified action was followed:

System Response Action: Application redirection messages (e.g., HTTP 307, DNS NS, SIP 3xx messages).

System Response Action: Human level redirection (e.g., "Click a URL or Direct user to open a new server address") or error messages (e.g., "Please try again").

Requesting the client to log in or provide SSL certificates in cases where they would normally not do so.

System actions to determine if human is in the loop for service requiring client user access:

System measures and compares connection level latency versus application level latencies. Clustering this information over the known good and bad client behavior determines whether this is a human or artificial (hence malicious) agent.

System provides CAPCHAs for the user to solve (existing technology and only available for limited protocols, for example HTTP and HTTPS).

Gathering the results of these stalling actions can often directly separate legitimate and attack clients without further action. For ambiguous cases, or for seemingly legitimate clients, the sum of information that is gathered forms a fingerprint. This fingerprint can be compared to subsequent behavior that clarified whether the clients with that fingerprint were legitimate or malicious. The fingerprint forms a method of identifying common characteristics of this class of clients (legitimate or attack), and thus allows subsequent reassignment of class for all hosts with the same or similar fingerprint after a small number of been determined to be legitimate or malicious.

With this approach, the defensive system can, through subtle information gathering techniques, make an educated guess as to whether a new client is an attacker or a legitimate client or even an innocent bystander that is being framed/impersonated by an attacker through address forgery.

Figure 7:
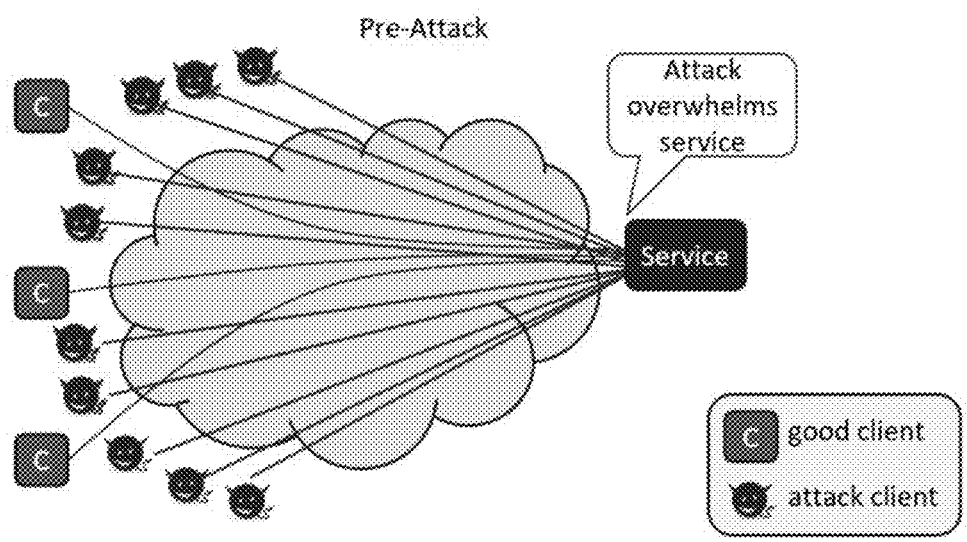
FIG. 7 is an illustration of various aspects of an environment in which aspects of embodiments of the present invention may be implemented.

Some embodiments of the present invention focus on defense against DDoS: scope (example) is the world-wide Internet; the system deceives attackers w.r.t. what address to attack and whether the attack is succeeding Distributed Denial of Service (DDoS) attacks are a serious problem in the Internet. Some solutions exist—e.g., to 'scrub out' malicious traffic—but these tend to be static and a sophisticated adversary can change his strategy to work around them. In a DDoS attack against a service, large numbers of malicious computers (clients) try to connect to a service (e.g., web server). Clients overwhelm the service, so that legitimate users experience very poor service or no service at all, and the attack may overwhelm the network in the vicinity of the server, as illustrated in FIG. 7.

Existing methods distinguish attack nodes by their historical behavior; i.e., they've attacked before. Not all attack nodes have historical behavior, but to maintain service efficiency and operability, the one or more programs should also distinguish these nodes quickly, from legitimate users. When a new client connects (unknown if good or bad) the proxy stalls it briefly to gather information. Proxy can perform various actions—e.g., drop packets, change protocol options, check if human is in the loop—to see how client responds. Gathered information may indicate whether system is legitimate or may be used as fingerprint that can be compared with fingerprints of known legitimate and attack clients. A sophisticated adversary may use observer nodes for reconnaissance and to monitor how the attack is performing. Observer behavior is similar to that of a legitimate client. Since observers don't attack, they are difficult for defender to identify.

Observers share information with attack nodes. Once an embodiment of the present invention identifies an observer, it can deceive the observer into thinking the attack is working—e.g., by denying it service. As a result, the observer will stop trying new strategies to make the attack work. Identifying attack observers is unique to embodiments of the present invention. Embodiments of the present invention include program code that performs the following functionality: 1) if observer shares the service (IP) address with attackers; 2) in response to attack, defense may disable attacked proxy and disperse its clients (good and bad) to other proxies. This may happen multiple times, with clients being assigned to different proxies. Each time, the observer shares its new proxy's address with multiple attackers; 3) after several iterations, through correlation an embodiment of the present invention can find that one 'seemingly legitimate' node, the observer, was attached to all attacked proxies; 4) if observer does not share the service address with attackers—i.e., each attacker performs its own DNS lookup.

In the DNS lookup, program code in an embodiment of the present invention looks at which clients accessed the service shortly before changes in the attack. Assumption is that a change in attack may, for example, be because the observer saw that the current attack strategy is not working. After each such change, an embodiment of the present invention gains confidence in which node is an observer. An embodiment of the present invention can further verify its hypothesis by using deception to change the level of service seen by the potential observer to see how the actual actions by the adversary—the attack traffic—change.

Unlike existing approaches, an embodiment of the present invention: 1) can identify attack nodes without having to see a large number of packets, misaddressed packets, or corrupted packets; 2) identifies observer nodes that a sophisticated attacker might employ; 3) does not solve the problem by requiring high bandwidth pipes and high capacity 'scrubbers' to remove attack traffic; and 4) dynamically allocates resources as needed for defense.

Embodiments of the present invention include a computer-implemented method, a computer program product, and a computer system where one or more programs, executed by one or more processors, generate, based on monitoring legitimate connections of one or more clients to a service, a fingerprint defining a legitimate client. The one or more programs receive, over a network connection, a request from a client to connect to a service provided by the one or more processors via one or more replicated service nodes. The one or more programs determine, based on at least one attribute of the client, the client has not previously connected to the service. The one or more programs provide, to the client, connection information to enable the client to connect to a replicated service node of the one or more replicated service nodes. Based on receiving the connection information, the one or more programs provide, to the client, access to the replicated service node, where the providing comprises delaying access of the client to the service. The one or more programs determine, during the delay, if the client comprises a legitimate client or an undesired client. The determining by the one or more programs includes the one or more programs generating one or more pre-defined actions directed at the client, evaluating responses of the client to the one or more predefined actions, and determining, based on the fingerprint, if the client is legitimate or undesired. The replicated service node may include a proxy.

In some embodiments of the present invention, the one or more pre-defined actions by the one or more programs include dropping one or more packets from the client, and the one or more programs evaluating includes the one or more programs observing at least one item selected from the group consisting of: packet request retry frequency, packet request retry timing, and change in rate of packets transmitted per a given interval. The one or more pre-defined actions may include the one or more programs dropping one or more packets from the client in a sequence or burst, and the one or more programs the evaluating may include the one or more programs observing a retransmission strategy of the client.

In some embodiments of the present invention, the one or more pre-defined actions by the one or more programs include the one or more programs delaying one or more packets from the client, and the one or more programs evaluating includes the one or more programs observing at least one item selected from the group consisting of: a change in a rate of transmission of packets or bytes, window size, and calculated Round Trip Time (RTT).

In some embodiments of the present invention, the pre-defined actions include one or more of the following: corrupting a response packet, manipulating a response packet, and duplicating a response packet, and wherein evaluating comprises observing at least one item selected from the group consisting of: network error messages, protocol error messages, and/or subsequent client behavior.

In some embodiments of the present invention, the pre-defined actions include the one or more programs adjusting apparent network characteristics, and the one or more programs evaluating includes the one or more programs observing at least one item selected from the group consisting of: changes in transmitted packet size, and changes in packet or byte transmission rate.

In some embodiments of the present invention, the pre-defined actions include the one or more programs adjusting protocol options in response to the client, and the one or more programs evaluating includes the one or more programs observing subsequent behavior of the client.

In some embodiments of the present invention, the pre-defined actions include the one or more programs passively observing the client, and the one or more programs evaluating includes the one or more programs monitoring the observing of at least one item selected from the group consisting of: sequence number selection, sequence of the sequence number selection, packet identification selection, sequence of the packet identification selection, transmission control protocol options selected, and operating system dependent selections.

In some embodiments of the present invention, the pre-defined actions include the one or more programs requesting that the client perform a requested action, and the one or more programs evaluating includes the one or more programs determining if the client performed the requested action. To determine if the client performed the requested action, the one or more programs may observe a response selected from the group consisting of: an application redirection message, a user entry, and an error message. The requested action may be requesting that the client provide security credentials.

In some embodiments of the present invention, the one or more pre-defined actions includes the one or more programs measuring a latency level of a connection between the replicated service node and the client, and the one or more programs evaluating includes the one or more programs determining if the latency level is comparable to application level latencies.

In some embodiments of the present invention, the one or more pre-defined actions includes the one or more programs providing, to the client, a CAPCHAs for a user of the client to solve.

In some embodiments of the present invention, based on determining that the client is legitimate, the one or more programs provide, to the client, access to the service, via the replicated service node. Based on determining that the client is legitimate, the one or more programs provide, to the client, a deceptive response. The deceptive response may include the one or more programs executing one or more of the following tasks: delaying responses from the replicated service node to the client, replicating network congestion by dropping one or more messages at one or more frequencies, and/or synthesizing one or more artificial responses to the client to indicate that the service is unavailable.

In some embodiments of the present invention, the one or more programs provide a deceptive response by simulating activities indicating that a previous attack on the replicated service node attack was successful.

Aspects of certain embodiments of the present invention also provide maneuvers for attack deception and mitigation. For some Internet attacks, such as DDoS attacks, the attack is predicated on attempting to overwhelm the target and prevent it from being able to carry out its mission (e.g., serve web pages, direct SIP calls, answer DNS requests, or provide any normal internet service). To prevent the attacker from being able to attack the resources providing the service directly, the invention uses proxies to limit information available to the attacker and to provide computational off-load, additional network bandwidth, and deceptive information and services to the attacker.

Proxies are used to relay requests from the remote clients and replies from the server that is providing the service. This relaying activity effectively hides the location and identity of the servers that actually provide the service. This prevents the adversary from being able to bypass the system defenses to locate and attack the actual servers providing the service. In addition, traffic filtering, manipulation of packets or content, delaying, rate limiting, prioritization, and redirection by proxies is used for disrupting attacks and deceiving adversaries.

While proxies have been used in the past for mitigating DDoS attacks and, in addition and as part of existing traffic scrubbing offerings, some embodiments of the present invention provide an advantage over these existing techniques by utilizing proxies for deceiving attackers as part of DDoS attack mitigation.

A Method 1 of the some embodiments of the present invention describes a new hybrid type of transparent reverse proxy that enables normal usage pattern and legacy code of the actual servers providing the service you want to protect, where (because it is transparent) the server (because it is reversed—associated with the server instead of the client) continues to see the true IP address of the client requesting service.

In order to accomplish the desired effect of this attack, the attacker must be able to locate an applicable resource to attack, the resource and attack must disrupt other users who are using that same resource, and the attack must have an effect long enough to achieve the desired effect. Method 2 of this invention describes a Proxy Shuffle maneuver that is designed to break the chain of events that must occur for an attacker to achieve their full desires. While at a high level it might be mistaken for a moving target defense system, it is markedly different in aim, implementation, and character to satisfy the need of wide-deployment (meaning no closed user groups with specials programs or keys) and world-wide usage on today's large networks—moving target defense systems can support neither class of activity. Similarly it could be mistaken for existing DDoS commercial defense system such as large scale scrubbing data centers that have large network pipes and many packet and connection processing systems to attempt to filter out the majority of the attack traffic—the proxy systems can be deployed on-demand at cloud data centers with world-wide scope to manipulate the attackers (and legitimate clients) into actions that will allow legitimate users to continue to use the service while limiting the effect and scope of the attack, or even deceiving the attacker into falsely believing the attack is successes. NEMESIS uses the Proxy Shuffle as a component in preventing the adversary attack from affecting legitimate users.

Method 1 to provide connection-specific selection of proxy type:

Proxies, even transparent proxies are of course old technologies. The first internet firewalls worked in either application proxy mode (where connections were intercepted, processed, and then regenerated) or in packet "proxy" mode (where specific packets were intercepted, processed, and then sent along—potentially after modification, especially modification of source addresses). Each type of proxy—packet processing or connection processing—has specific advantages for specific circumstances. Packet processing systems are typically more light weight in terms of processing capabilities, but they are more limited in capability. Connection processing systems (which may not always involve terminating and regenerating a network connection) are the reverse, and so, for example, might have the ability to decrypt SSL encrypted session—something that would be impossible for packet processing systems but thus require more resources and processing.

An innovation of this method is to have a system that will dynamically select between packet and connection proxy modes on a connection by connection basis. This allows the proxy to perform different actions (described below) for attack deception and mitigation. As each new connection arrives, based on the reputation and other gathered and historical information (as described in other invention disclosure) available about the source of the connection, the proxy may decide to treat the connection in packet mode or in connection mode. To the best of our knowledge, deciding how to handle client connections on a connection-by-connection basis has not been either described in the literature or included in a product/service offering. While some Juniper network devices allow both packet and flow processing to take place, such processing is not enabled on a connection by connection basis. Rather, all connections go through both packet and flow processing.

In packet mode, the proxy examines and measures each received packet and decides whether to forward it through a tunnel to eventually be delivered (after the destination address may have been adjusted) to the actual server providing service. This tunnel forwarding may be accomplished by putting a new delivery header on the "front" of an existing packet, using for example, the IP-IP method. The tunnel forwarding could also be accomplished by adjusting the destination address of the received packet. Alternately, it could use an IPSEC, GRE, PPTP, or OpenVPN tunnel to fully encrypt or encapsulate the packet. Other tunnel encoding systems, including ones that add reliability to or adjust the characteristics (e.g., size, timing) of the tunneled packets could be equally well used.

Packet mode enables the system to add deceptive effects such as dropping packets, adding delays, adding jitter, corrupting packets, or sending network-level error messages (such as TCP RST or ICMP error messages), or adjusting characteristics of the packet, such as the time to live (TTL) of the packet to deceive attackers into believing that their attack is succeeding. In packet mode, the received packet could be duplicated, encoded, split, or aggregated with other packets while in the tunnel. Further, the proxy can select a specific server or data center to send the packets to—for higher level deceptions, there could be deceptive service simulators (e.g., honeypots or sacrificial servers) available that attack or observer packets can be routed to. All of these effects, when applied at the appropriate times in the appropriate measures, will reduce the true information available to the attacker and in fact make it appear that things are happening (such as an attack preventing legitimate users from obtaining service) that actually are not happening.

In connection mode, the proxy terminates the network connection, such as a TCP connection, on the proxy system. The proxy system then makes a new connection to the actual server providing service (either directly or through a tunnel as described in the packet-processing mode). The source address of the new connection may be the IP address of the proxy system or may be the IP address of the true client (the functionality that a transparent proxy provides). The advantage of using the client's true IP address is that legacy services do not need adjustment and can provide more accurate logs. The advantage of using the proxy IP address is that normal networking for communications from the actual server providing service can be used—in transparent mode the system, through topology, routing, and tunnels, causes all packets from the server to the internet to pass through the proxy.

While all packet-mode actions, such as delay, dropping packets, forgery, and adjustments are available in connection mode, additional deception and defensive actions are available. Connection mode also enables the system to decrypt SSL (or similar computationally expensive non-application processing) and validate client certificates. The system can also use a plugin to simulate the application level effects of an attacked system in encrypted or unencrypted streams. It can inject error, warning, or delay messages (packet volume is especially high, please stand by) to deceptively simulate the effects of an attack. Packet level system cannot easily inject such messages because they would break the integrity of the encryption (close to impossible to remedy) or connection accounting (expensive to remedy, similar in cost to connection processing described above), for protocols like TCP.

By being able to select between packet and connection processing modes on a connection by connection basis, the proxy has the ability to adjust proxy processing load, true-server processing load, and deceptive effects that clients experience; which provides the defensive system with the ability to more flexibly mitigate Internet attacks.

Several factors can influence the decision of which proxy mode to use for a new client connection. In some embodiments, a proxy may use a packet mode for a new client connection and then switch to a connection mode for subsequent connections when the client is determined to be part of a DDoS attack by either the proxy itself or an external system. In some embodiments, a proxy may use a client IP reputation database for determining which mode to use. For example, for client IPs associated with known botnets, depending on attack state and available resources, a packet or connection mode approach may be used for deception. In some embodiments, a proxy switches between the two modes based on information received by an external system that is responsible for evaluating the client behavior using data analytics or some other techniques. In some embodiments, a proxy can decide on which mode to use based on client reactions to specific deception actions employed by the proxy.

Embodiments of the present invention include a computer-implemented method, a computer program product, and a computer system where one or more programs establish a communications connection between a replicated service node and a data source, where the data sources utilizes the communications connection to the replicated service node to access a service hosted at one or more servers. The one or more programs receive, at the replicated service node, a packet. The one or more programs determine if any descriptive information related to the data source is available to the one or more processors and if available, the one or more programs acquire the descriptive information. Based on content of the descriptive information or the absence of descriptive information, the one or more programs select a mode for the communications connection between the replicated service node and the data source, the mode selected from the group consisting of: packet mode and connection mode. The one or more programs act on the packet to reduce information in the packet available to an attacker during communications between the data source and the replicated service node.

In some embodiments of the present invention, the one or more programs act on the packet by delaying the packet or dropping the packet.

In some embodiments of the present invention, the replicated service node is a proxy.

In some embodiments of the present invention, the descriptive information is available and the descriptive information includes historical information about the data source.

In some embodiments of the present invention, the mode includes packet mode and the one or more programs act on the packet by examining the packet at receipt at the replicated service node and the one or more programs measure by measuring the packet. The one or more programs determine whether to forward the packet through a tunnel to be delivered to the one or more servers. The one or more programs may forward the packet through the tunnel. In forwarding the packet, the one or more programs may manipulate the packet by adding a delivery header to the packet, adjusting a destination address of the packet, encrypting the packet, and/or encapsulating the packet.

In some embodiments of the present invention, the mode is a packet mode and the one or more programs act on the packet by adding a deceptive effect to the packet, where the deceptive effect reduces information related to the packet available to a potential attacker by simulating an activity in the communications connection that is not occurring. The deceptive effect may be a simulation of the activity, including one or more of: dropping the packet, adding a delay to transmission of the packet, adding jitter to the communications connection, modifying the packet, modifying content of the packet, corrupting the packet, sending error messages, and/or adjusting characteristics of the packet. The one or more programs may also duplicate, encode, split, or aggregate the packet, while in the tunnel. The one or more programs may select a server of the one or more servers as a destination for the packet.

In some embodiments of the present invention, the mode is a packet mode, and the one or more programs utilize the replicated service node to terminate the communications connection. The one or more programs establish a new communications connection between the data source and the one or more servers. In some embodiments of the present invention, the new communications connection is one of the following: a direct connection or a connection through a tunnel. An address of the new communications connection may include an address of a system that generated the replicated service node or an address of a true client of the service.

In some embodiments of the present invention, the mode is a packet mode, and the one or more programs add a deceptive effect to the packet, where the deceptive effect reduces information related to the packet available to a potential attacker by simulating an activity in the communications connection that is not occurring. The deceptive effect is a simulation of one or more of the following activities: utilizing a plugin to simulate effects of an attacked system in encrypted or unencrypted streams and/or injecting messages to simulate effects of an attack.

In some embodiments of the present invention, the mode is a packet mode, and the one or more programs execute a defensive action of the packet, where the defensive action include the one or more programs validating a client certification of the data source.

In some embodiments of the present invention, the one or more programs select the mode for the communications connection by selecting the packet mode based on the absence of descriptive information. The one or more programs may determine that the data source is part of an attack and switch the mode to connection mode for subsequent packets from the data source. The one or more programs may also determine that the data source is part of an attack and discard the packet from the data source. In some embodiments of the present invention, the descriptive information includes information from a source selected from the group consisting of: an IP reputation database and a system or component responsible for evaluating the data source behavior using data analytics.

In some embodiments of the present invention, the one or more programs monitor a reaction of the data source to the deceptive effect. The one or more programs switch the mode based on the reaction.

Method 2 to manipulate the number and location of proxies:

This method presents a Proxy Shuffle maneuver that consists of several related actions that provide deception and mitigation for Internet-based attacks. Embodiments of the present invention provide advantages over existing approaches to attack mitigation by not only utilizing a variety of deceptive response, but also, in certain embodiments of the present invention, dynamically selecting the responsive/deceptive action to mitigate a given attack. Furthermore, while existing DDoS mitigation services utilize custom devices for implementing the proxy concepts described in this invention, the proposed methods and apparatus could be implemented in software and use a variety of execution environments, including VMs, Docker containers, and custom hardware boxes.

The first action is to add more proxies, which may be accomplished at Internet Cloud Data Centers. New proxies will be assigned their own unique IP addresses. Of course under normal circumstances, it will most likely be desirable to immediately or eventually cause existing or new clients to be distributed to these new proxies. Adding resources allows the proxies to perform additional processing and provide additional scrutiny of and on the incoming packets, connections, and data. It also provides additional network bandwidth to allow the defensive system to process the gigabit or even terabit attacks that modern adversaries can summon.

The second action is to remove proxies (i.e., remove the association between a proxy IP address and the service (or services) the proxy represents). Proxies may be removed for several reasons: they may be removed to save money once the attack has changed or been eliminated, or they may be removed because an attack that is concentrated on a single proxy has overwhelmed it and it can no longer provide useful service to legitimate clients. A sufficiently large attack can overwhelm one, or a small number of, proxies. It may in fact be desirable for the defensive system that an attacker concentrate their attack on a small number of proxies if this leaves legitimate users that are obtaining service through other proxies undisturbed. Note that removing proxies may be a planned action where legitimate users are given time or specific instructions to move to different systems to provide a graceful transition, or may be abrupt and without warning which may disrupt some legitimate users. Which approach is taken may depend on circumstances such as whether the legitimate clients are obtaining sufficient levels of service or whether the legitimate clients can be contacted at all.

The next action is to move proxies (i.e., assign a different IP address to a proxy). While this typically would be performed with an "ADD" followed by a "REMOVE" action (as described above) to provide overlap and transition, in modern internet cloud data centers you can typically change the public address (the ones clients use) without actually affecting the running system. Other options include changing network address translation (NAT) tables to add and (potentially eventually) remove public IP address mappings for an existing server.

The purpose of the move action is to prevent the adversary from being able to always know the full number, identity, and location of the resources arrayed against them. Proxies appear, disappear, and change total numbers at regular or random intervals to deceive and deny information to the adversary to prevent them from being able to disrupt all systems at once. By preventing an adversary from gaining detailed knowledge about the defense mechanisms that are in place for protecting a service, we may be able to limit the effect of the DDoS attack and, hence, both maintain service availability and reduce any costs associated with handling large volumes of DDoS traffic.

The fourth action is the ability to hide proxies. When a particular proxy has a number of legitimate clients and is not being attacked, that proxy could be hidden so that no new clients will ever be assigned to it. The existing users can continue to use them as long as a sufficient number of legitimate users are using it to make it worthwhile to pay the expense of the additional resource. This provides the ability to keep long term legitimate users happy even in the face of an overwhelming attack. One way of achieving this is by removing the proxy's IP address from the list of IP addresses associated with the service returned to a client in response to a DNS name resolution query. In the preferred implementation, clients would not receive the full list of all possible IP addresses associated with the service under any non-trivial circumstance. Instead they would receive a subset, possibly one, of IP addresses and more IP addresses associated with the service would not be revealed upon subsequent queries unless the proxies that were assigned were no longer available (if the proxy was designated as sacrificial, even if it were down it would continue to be returned to known attackers or attacker proxies). As such, in this implementation, new clients simply would never receive the hidden proxy's IP address as the one or subset of IP addresses associated with the service.

A related action is the ability to freeze proxies. Adversaries may get used to the concept and pattern of finding a proxy, attacking it, making it unusable, and then having that proxy removed after which they must find a new proxy. This action takes advantage of the pattern the adversary has and performs actions necessary to make the proxy appear to be deallocated from the perspective of the attacker. Filtering can be added to make the system disappear from the network perspective for the majority of remote clients and thus appear to have gone away. Legitimate users still using that proxy can be specifically authorized to continue to use that system and new legitimate users can likewise be specifically authorized to use that system. The attacker will have assumed that the system is no longer in use and will stop attacking it to find another potential system to attack, at which time the frozen proxy becomes a hidden proxy. It is critical that the decision to freeze versus remove be random or not externally determinable to prevent the attacker from being able to guess whether they are wasting resources by attacking a proxy that does not exist anymore or attacking a proxy that might still be in use.

Finally, the last action the Proxy Shuffle maneuver might use is to sacrifice itself so that the attackers (and ideally only the attackers) will continue to attack it. The sacrifice might be proactive or reactive. A proactive sacrifice is one that is planned where the system directs the attackers to a specific proxy. This is best done when the system can affect the choice of systems that the attacker can attack by limiting or providing deceptive information available to the attacker via the observation nodes that they use. A reactive sacrifice could be used when the majority of the systems using a specific proxy are attack nodes. The legitimate clients might be migrated off (or left to die) and the proxy might stay up so that the attacker wastes resources attacking a system that few or no legitimate users are using. This could be combined with a maneuver to have the proxy forward the attack clients to a simulation of the actual server providing the service to even further limit the effects of the attack and to present the appearance of a real service that the adversary is attacking.

Through the combination of these actions, the proxy shuffle maneuver can be effectively used by the defensive system to react to attacks by absorbing them, keeping legitimate users away from the attack so that they can get service, deceiving the attacker in order to waste his resources, and limiting the information the attacker can gather about the resources arrayed against them, and limiting the useful lifetime of the information they do gather. The adversary is left with the choice of dispersing their attack and needing to take down hundreds or thousands of proxies scattered around the world—effectively impossible—or attempting to target specific proxies and failing to affect the majority of the legitimate users. In these ways, the adversary cannot locate all defensive server systems (including proxies) and actual service-providing resources (including servers). The adversary thus cannot affect all legitimate users using the service at the same time, and the adversary cannot affect even some legitimate users for long periods of time.

Distributed Denial of Service (DDoS) attacks are a serious problem in the Internet. Some solutions exist—e.g., to 'scrub out' malicious traffic—but these tend to be static and a sophisticated adversary can change his strategy to work around them. In a DDoS attack against a service, large numbers of malicious computers (clients) try to connect to a service (e.g., web server). This overwhelms the service, so that legitimate users experience very poor service or no service at all, and the attack may overwhelm the network in the vicinity of the server A basic DDoS attack is illustrated in FIG. 7.

NEMESIS: Network Maneuvering for Survivable Internet Services is a name that can be used to refer to certain aspects of embodiments of the present invention. A goal is to allow service to "good" users, deceive attackers into believing attack worked, withstanding the highest levels of volumetric DDoS attacks without high costs. This is accomplished by one or more of: using cloud service providers to diffuse, deceive, and maneuver around attacks, establishing optimal Courses of Actions (COAs) for attacks using game-theoretic war-gaming, and dynamically adjusting selected maneuvers using stochastic control An embodiment of the present invention hides and provides deceptive information about critical resources to prevent NEMESIS bypass and provides a framework for integrated, coordinated defense plans.

Figure 8:
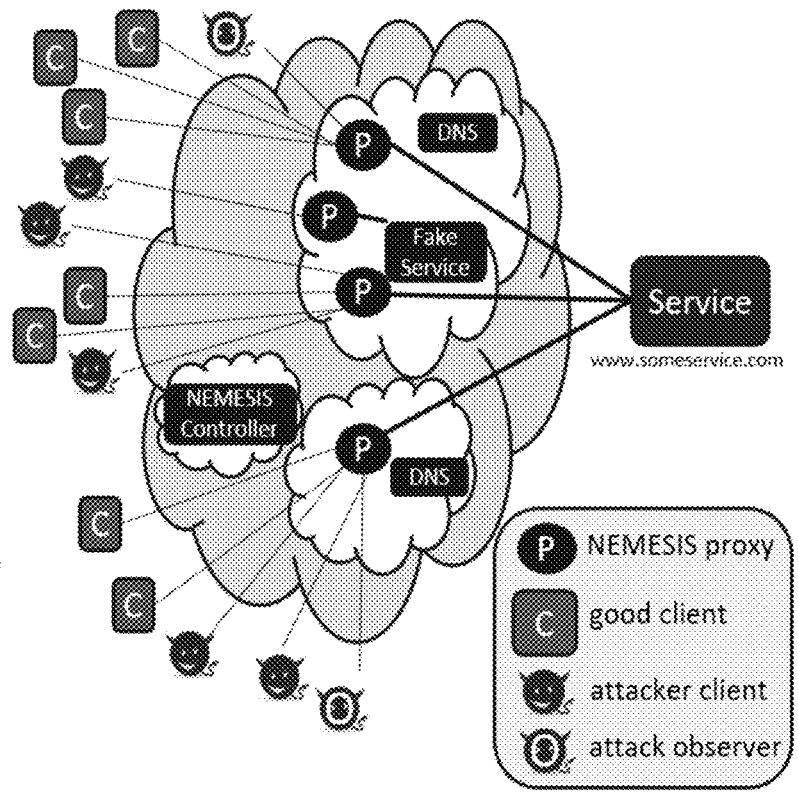
FIG. 8 is an illustration of various aspects of an environment in which aspects of embodiments of the present invention may be implemented.

Embodiments of the present invention hide services behind cloud-based proxies, as illustrated in FIG. 8.

General Strategy: identify adversary nodes (attacker and attack observer), try to direct adversary nodes and good clients to different sets of proxies, good clients receive normal service through their proxies, proxies used by adversary nodes deceive their clients into believing that the attack is succeeding, and/or if attack is affecting service for good clients, use deception to mitigate.

Deceive adversary by: periodically changing the number and location (IP address) of proxies, hide proxies that are providing service to only legitimate users (i.e., stop giving out the IP address of the proxy to new clients), and/or affecting adversary's connection to make it think its attack is succeeding (e.g., delay/drop packets, return error).

In general, stymie the adversary by: wasting his resources, limiting the information (and lifetime of the information) that he can gather about the defense, dispersing his attack, and/or preventing him from seriously affecting legitimate clients.

Through the use of proxies and strategic, dynamic changes to the number, location, and behavior of the proxies, NEMESIS can deceive an attacker causing his DDoS resources to be dispersed and wasted. Unlike other approaches NEMESIS: 1) can identify attack nodes without having to see a large number of packets, misaddressed packets, or corrupted packets; 2) identifies observer nodes that a sophisticated attacker might employ; 3) does not solve the problem by requiring high bandwidth pipes and high capacity 'scrubbers' to remove attack traffic; and/or 4) dynamically allocates resources as needed for defense.

Embodiments of the present invention include a computer-implemented method, a computer program product, and a computer system, where one or more programs, executed by one or more processors generate, on a network, a plurality of replicated service nodes to provide a service hosted at one or more serves to a plurality of clients. The one or more programs determine that a first portion of the clients are engaged in one or more attacks on one or more replicated service nodes of the plurality of replicated service nodes. Based on the one or more programs determining, the one or more programs remove a first portion of the plurality of replicated service nodes. Based on the one or more programs determining, the one or more programs move a second portion of the plurality of replicated service nodes to new addresses. In some embodiments of the present invention, the one or more programs remove the first portion by terminating a connection between each replicated service node of the first portion and the one or more servers. In some embodiments of the present invention, this removing includes the one or more programs providing no responses to packets received from the first portion of the clients. The plurality of replicated service nodes may comprise proxies. The one or more programs may terminate a connection between each replicated service node of the first portion and the one or more servers by, for each replicated service node, removing an association between an address of a replicated service node and the service. The one or more programs may terminate a connection between each replicated service node of the first portion and the one or more servers by, for each replicated service node: designating, as not usable, an association between an address of a replicated service node and the service stored on one or more network resources on the network.

In some embodiments of the present invention, the one or more programs generate the plurality of replicated service nodes to provide the service hosted at the one or more serves to the plurality of clients by, for each replicated service node: assigning a unique address to a replicated service node, and distributing, to the replicated service node, one or more clients of the plurality of clients to the service node, where the one or more clients utilize the replicated service node to access the service.

In some embodiments of the present invention, the one or more programs perform, via the replicated service node, additional processing on packets from the one or more clients. The one or more replicated service nodes may include the first portion of the plurality of replicated service nodes.

In some embodiments of the present invention, the one or more programs identify a second portion of clients, where the first portion of clients and the second portion of clients are mutually exclusive. Concurrent with the one or more programs moving the second portion of the plurality of replicated service nodes to the new addresses, the one or more programs provide, to the second portion of the clients, instructions to connect to one or more of the second portion of the plurality of replicated service nodes at the new addresses.

In some embodiments of the present invention, the one or more programs change, at an interval, a number of operational replicated service nodes by generating, at the interval, an additional plurality of replicated service nodes to provide a service hosted at one or more serves to a plurality of clients. The interval selected may be random or advantageous.

In some embodiments of the present invention, the one or more programs changing includes the one or more programs removing one or more of the operational replicated service nodes, where the operational replicated service nodes include the plurality of replicated service nodes and the additional plurality of replicated service nodes.

In some embodiments of the present invention, the one or more programs identify a second portion of the plurality of clients, where the first portion of the clients and the second portion of the clients are mutually exclusive. The one or more programs identify a replicated service node connected to one or more clients of the second portion of clients. The one or more programs also prevent additional clients of the plurality of clients from connecting to the replicated service node.

In some embodiments of the present invention, the one or more programs identify a second portion of the plurality of clients, where the first portion of the clients and the second portion of the clients are mutually exclusive. The one or more programs identify a replicated service node connected to one or more clients of the second portion of clients. The one or more programs modify mappings of the one or more clients of the second portion of clients to the replicated service node. This modifying may include the one or more programs designating, by the one or more processors, a selected replicated service node of the plurality of replicated service nodes as a sacrificial service node, and the one or more programs mapping the one or more clients of the second portion of clients to the sacrificial replicated service node.

The one or more programs may prevent additional clients of the plurality of clients from connecting to the replicated service node by removing an address of the replicated service node from a list of replicated service nodes associated with the service. The one or more programs may prevent additional clients of the plurality of clients from connecting to the replicated service node by rejecting any new requests to connect to the replicated service node.

In some embodiments of the present invention, concurrent with the one or more programs moving the second portion of the plurality of replicated service nodes to the new addresses, the one or more programs provide, to the first portion of the clients, instructions to connect to one of the second portion of the plurality of replicated service nodes at a new address.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
    receiving, by one or more processors, over a network connection, a request from a first client for an attribute of a first service node, wherein the attribute of the first service node is utilized to access a service provided by the one or more processors, and wherein the first service node comprises a node of one or more service nodes utilized by the one or more processors to distribute the service;
    providing, by the one or more processors, the attribute of the first service node to the first client;
    accepting, by the one or more processors, an access to the service by the first client, based on the first client utilizing the attribute of the first service node to connect to the first service node;
    identifying, by the one or more processors, attributes of one or more clients accessing the service via the first service node at a given time, wherein the first client is a client of the one or more clients accessing the service via the first service node at the given time;
    experiencing, by the one or more processors, an event indicating a need to change security protecting access to the service;
    redistributing, by the one or more processors, the one or more clients accessing the service via the first service node at the given time to at least two additional service nodes, wherein each client of the one or more clients accessing the service via the first service node at the given time utilizes one service node of the at least two additional service nodes to access the service, wherein the redistributing comprises:
        providing, by the one or more processors, the first client with a second attribute to utilize to connect to a second service node, wherein the at least two additional service nodes comprise the second service node; and
        accepting, by the one or more processors, an additional access to the service by the first client, based on the first client utilizing the second attribute to connect to the second service node;
    identifying, by the one or more processors, attributes of one or more clients accessing the service via the second service node after the redistributing of the one or more clients accessing the service via the first service node at the given time, wherein the first client is a client of the one or more clients accessing the service via the second service node after the redistributing of the one or more clients accessing the service via the first service node at the given time;

experiencing, by the one or more processors, another event indicating a need to change the security protecting access to the service;

comparing, by the one or more processors, the attributes of the one or more clients accessing the service via the first service node at the given time and the attributes of the one or more clients accessing the service via the second service node after the redistributing of the one or more clients accessing the service via the first service node at the given time, to identify a first portion of the one or more clients associated with one or more common attributes between the one or more clients accessing the service via the first service node at the given time and the one or more clients accessing the service via the second service node after the redistributing of the one or more clients accessing the service via the first service node at the given time, wherein an attribute of the first client comprises a common attribute of the one or more common attributes, and redistributing, by the one or more processors, the one or more clients accessing the service via the second service node after the redistributing of the one or more clients accessing the service via the first service node at the given time to at least two new service nodes, wherein the at least two new service nodes comprise a third service node associated with a third attribute, and a fourth service node, and wherein the redistributing comprises:

providing, by the one or more processors, a second portion of the one or more clients accessing the service via the second service node, wherein the second portion comprises one or more clients of the one or more clients accessing the service via the second service node not represented by the one or more common attributes, with a fourth attribute to utilize to connect to the fourth service node.

2. The computer-implemented method of claim 1, further comprising:

disabling, by the one or more processors, the first service node.

3. The computer-implemented method of claim 1, wherein experiencing the event comprises:

determining, by the one or more processors, that the first service node is experiencing an attack.

4. The computer-implemented method of claim 1, wherein experiencing the event comprises:

determining, by the one or more processors, that one or more adversarial client is present on the network.

5. The computer-implemented method of claim 1, wherein the experiencing the other event comprises:

determining, by the one or more processors, that the second service node is experiencing an attack, wherein the redistributing the one or more clients accessing the service via the second service node after the redistributing of the one or more clients accessing the service via the first service node further comprises:

providing, by the one or more processors, the first portion of one or more clients represented by the one or more common attributes, with the third attribute to utilize to connect to the third service node.

6. The computer-implemented method of claim 5, further comprising:

providing, by the one or more processors, to the first portion of the one or more clients associated with the one or more common attributes, a deceptive response.

7. The computer-implemented method of claim 6, wherein providing the deceptive response comprises:

redistributing, by the one or more processors, the one or more clients accessing the service via the third service node after the redistributing of the one or more clients accessing the service via the second service node to at least two additional new service nodes, wherein each of the one or more clients accessing the service via the third service node after the redistributing of the one or more clients accessing the service via the second service node utilizes one service node of the at least two additional new service nodes to access the service, wherein the redistributing comprises:

providing, by the one or more processors, the first client with a fifth attribute to utilize to connect to a fifth service node, wherein the at least two additional new service nodes comprise the fifth service node; and accepting, by the one or more processors, an additional access to the service by the first client, based on the first client utilizing the fifth attribute to connect to the fifth service node.

8. The computer-implemented method of claim 7, further comprising:

identifying, by the one or more processors, attributes of one or more clients accessing the service via the fifth service node, wherein after the redistributing of the one or more clients accessing the service via the third service node, the first client is a client of the one or more clients accessing the service via the fifth service node;

determining, by the one or more processors, that the fifth service node is experiencing an attack;

comparing, by the one or more processors, the attributes of the one or more clients accessing the service via the first service node at the given time, the attributes of the one or more clients accessing the service via the second service node after the redistributing of the one or more clients accessing the service via the first service node at the given time, the attributes of the one or more clients accessing the service via the third service node after the redistributing of the one or more clients accessing the service via the second service node, and the attributes of the one or more clients accessing the service via the fifth service node to identify a particular portion of the one or more clients associated with one or more common attributes between the one or more clients accessing the service via the first service node at the given time, the one or more clients accessing the service via the second service node after the redistributing of the one or more clients accessing the service via the first service node at the given time, the one or more clients accessing the service via the third service node after the redistributing of the one or more clients accessing the service via the second service node, and the one or more clients accessing the service via the fifth service node, wherein the attribute of the first client comprises a common attribute of the one or more common attributes; and providing, by the one or more processors, to the particular portion, wherein the particular portion comprises the first client, an additional deceptive response, wherein the additional deceptive response simulates activities indicating that the attack was successful.

9. The computer-implemented method of claim 5, further comprising:
providing, by the one or more processors, via the third service node, a deceptive response to the first portion of the one or more clients; and
providing, by the one or more processors, via the fourth service node, access to the service.

10. The computer-implemented method of claim 1, wherein the first service node and the at least two additional service nodes are selected from the group consisting of: replicated service nodes and proxies.

11. The computer-implemented method of claim 1, wherein the attribute of the first service node, the attributes of one or more clients accessing the service via the first service node at the given time, and the second attribute comprise addresses.

12. The computer-implemented method of claim 11, wherein the network connection comprises an Internet connection, and wherein the addresses comprise Internet Protocol addresses.

13. A computer program product comprising:
a non-transitory computer readable storage medium readable by one or more processors and storing instructions for execution by the one or more processors for performing a method comprising:
receiving, by the one or more processors, over a network connection, a request from a first client for an attribute of a first service node, wherein the attribute of the first service node is utilized to access a service provided by the one or more processors, and wherein the first service node comprises a node of one or more service nodes utilized by the one or more processors to distribute the service;
providing, by the one or more processors, the attribute of the first service node to the first client;
accepting, by the one or more processors, an access to the service by the first client, based on the first client utilizing the attribute of the first service node to connect to the first service node;
identifying, by the one or more processors, attributes of one or more clients accessing the service via the first service node at a given time, wherein the first client is a client of the one or more clients accessing the service via the first service node at the given time;
experiencing, by the one or more processors, an event indicating a need to change security protecting access to the service; redistributing, by the one or more processors, the one or more clients accessing the service via the first service node at the given time to at least two additional service nodes, wherein each client of the one or more clients accessing the service via the first service node at the given time utilizes one service node of the at least two additional service nodes to access the service, wherein the redistributing comprises:
providing, by the one or more processors, the first client with a second attribute to utilize to connect to a second service node, wherein the at least two additional service nodes comprise the second service node; and
accepting, by the one or more processors, an additional access to the service by the first client, based on the first client utilizing the second attribute to connect to the second service node;
identifying, by the one or more processors, attributes of one or more clients accessing the service via the second service node after the redistributing of the one or more clients accessing the service via the first service node at the given time, wherein the first client is a client of the one or more clients accessing the service via the second service node after the redistributing of the one or more clients accessing the service via the first service node at the given time;
experiencing, by the one or more processors, another event indicating a need to change the security protecting access to the service;
comparing, by the one or more processors, the attributes of the one or more clients accessing the service via the first service node at the given time and the attributes of the one or more clients accessing the service via the second service node after the redistributing of the one or more clients accessing the service via the first service node at the given time, to identify a first portion of the one or more clients associated with one or more common attributes between the one or more clients accessing the service via the first service node at the given time and the one or more clients accessing the service via the second service node after the redistributing of the one or more clients accessing the service via the first service node at the given time, wherein an attribute of the first client comprises a common attribute of the one or more common attributes; and
redistributing, by the one or more processors, the one or more clients accessing the service via the second service node after the redistributing of the one or more clients accessing the service via the first service node at the given time to at least two new service nodes, wherein the at least two new service nodes comprise a third service node associated with a third attribute, and a fourth service node, and wherein the redistributing comprises:
providing, by the one or more processors, a second portion of the one or more clients accessing the service via the second service node, wherein the second portion comprises one or more clients of the one or more clients accessing the service via the second service node not represented by the one or more common attributes, with a fourth attribute to utilize to connect to the fourth service node.

14. The computer program product of claim 13, wherein the experiencing the other event comprises:
determining, by the one or more processors, that the second service node is experiencing an attack.

15. The computer program product of claim 14, the method further comprising:
providing, by the one or more processors, the first portion of the one or more clients associated with the one or more common attributes, a deceptive response.

16. The computer program product of claim 15, wherein the deceptive response is selected from the group consisting of: delaying responses from the second service node to the portion of the one or more clients, replicating network congestion by dropping one or more messages at one or more frequencies, and synthesizing one or more artificial responses to the portion of the one or more clients to indicate that the service is unavailable.

17. The computer program product of claim 15, wherein providing the deceptive response comprises:
analyzing, by the one or more processors, the attack on the second service node; and based on the analyzing, constructing, by the one or more processors, the deceptive response, wherein the deceptive response simulates activities indicating that the attack was successful.

18. The computer program product of claim 13, wherein the redistributing the one or more clients accessing the service via the second service node after the redistributing of the one or more clients accessing the service via the first service node further comprises:
provided, by the one or more processors, the portion of one or more clients represented by the one or more common attributes, with a third attribute to utilize to connect to the third service node.

19. A system comprising:
a memory;
one or more processors in communication with the memory; and program instructions executable by the one or more processors via the memory to perform a method, the method comprising:
receiving, by the one or more processors, over a network connection, a request from a first client for an attribute of a first service node, wherein the attribute of the first service node is utilized to access a service provided by the one or more processors, and wherein the first service node comprises a node of one or more service nodes utilized by the one or more processors to distribute the service;
providing, by the one or more processors, the attribute of the first service node to the first client;
accepting, by the one or more processors, an access to the service by the first client, based on the first client utilizing the attribute of the first service node to connect to the first service node;
identifying, by the one or more processors, attributes of one or more clients accessing the service via the first service node at a given time, wherein the first client is a client of the one or more clients accessing the service via the first service node at the given time;
experiencing, by the one or more processors, an event indicating a need to change security protecting access to the service;
redistributing, by the one or more processors, the one or more clients accessing the service via the first service node at the given time to at least two additional service nodes, wherein each client of the one or more clients accessing the service via the first service node at the given time utilizes one service node of the at least two additional service nodes to access the service, wherein the redistributing comprises:
providing, by the one or more processors, the first client with a second attribute to utilize to connect to a second service node, wherein the at least two additional service nodes comprise the second service node; and
accepting, by the one or more processors, an additional access to the service by the first client, based on the first client utilizing the second attribute to connect to the second service node;

identifying, by the one or more processors, attributes of one or more clients accessing the service via the second service node after the redistributing of the one or more clients accessing the service via the first service node at the given time, wherein the first client is a client of the one or more clients accessing the service via the second service node after the redistributing of the one or more clients accessing the service via the first service node at the given time;

experiencing, by the one or more processors, another event indicating a need to change the security protecting access to the service;

comparing, by the one or more processors, the attributes of the one or more clients accessing the service via the first service node at the given time and the attributes of the one or more clients accessing the service via the second service node after the redistributing of the one or more clients accessing the service via the first service node at the given time, to identify a first portion of the one or more clients associated with one or more common attributes between the one or more clients accessing the service via the first service node at the given time and the one or more clients accessing the service via the second service node after the redistributing of the one or more clients accessing the service via the first service node at the given time, wherein an attribute of the first client comprises a common attribute of the one or more common attributes; and redistributing, by the one or more processors, the one or more clients accessing the service via the second service node after the redistributing of the one or more clients accessing the service via the first service node at the given time to at least two new service nodes, wherein the at least two new service nodes comprise a third service node associated with a third attribute, and a fourth service node, and wherein the redistributing comprises:
providing, by the one or more processors, a second portion of the one or more clients accessing the service via the second service node, wherein the second portion comprises one or more clients of the one or more clients accessing the service via the second service node not represented by the one or more common attributes, with a fourth attribute to utilize to connect to the fourth service node.

20. The system of claim 19, wherein the redistributing the one or more clients accessing the service via the second service node after the redistributing of the one or more clients accessing the service via the first service node further comprises: providing, by the one or more processors, the first portion of one or more clients represented by the one or more common attributes, with the third attribute to utilize to connect to the third service node.

* * * * *